(12) United States Patent
Blue

(10) Patent No.: US 7,188,344 B1
(45) Date of Patent: Mar. 6, 2007

(54) ARCHITECTURE FOR A READ/WRITE THREAD LOCK

(75) Inventor: Reginald V. Blue, Ashburn, VA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/468,469

(22) Filed: Dec. 21, 1999

(51) Int. Cl.
*G06F 9/46* (2006.01)

(52) U.S. Cl. .................................. 718/106; 718/102

(58) Field of Classification Search ........ 717/114–119; 710/200; 709/100, 102, 104, 107, 108; 707/7, 707/8, 201; 718/100, 102, 104, 107, 108, 718/106
See application file for complete search history.

(56) References Cited

U.S. PATENT DOCUMENTS

| | | | | |
|---|---|---|---|---|
| 4,249,241 | A | | 2/1981 | Aberle et al. ............... 364/200 |
| 4,435,766 | A | * | 3/1984 | Haber et al. ................ 710/200 |
| 5,161,227 | A | | 11/1992 | Dias et al. .................. 395/650 |
| 5,226,143 | A | | 7/1993 | Baird et al. ................. 395/425 |
| 5,285,528 | A | | 2/1994 | Hart ........................... 395/725 |
| 5,454,108 | A | | 9/1995 | Devarakonda et al. ...... 395/650 |
| 5,623,659 | A | * | 4/1997 | Shi et al. ....................... 707/8 |
| 5,678,026 | A | * | 10/1997 | Vartti et al. ................. 711/152 |
| 5,721,943 | A | * | 2/1998 | Johnson ...................... 713/300 |
| 5,727,203 | A | | 3/1998 | Hapner et al. .............. 395/614 |
| 5,761,659 | A | * | 6/1998 | Bertoni ........................... 707/8 |
| 5,761,670 | A | * | 6/1998 | Joy ........................ 707/103 R |
| 5,909,695 | A | | 6/1999 | Wong et al. ................ 711/133 |
| 5,931,919 | A | * | 8/1999 | Thomas et al. ............. 709/315 |
| 5,933,825 | A | * | 8/1999 | McClaughry et al. .......... 707/8 |
| 5,940,828 | A | | 8/1999 | Anaya et al. .................. 707/8 |
| 5,968,157 | A | | 10/1999 | Joy et al. .................... 710/200 |
| 5,983,225 | A | * | 11/1999 | Anfindsen ...................... 707/8 |
| 6,029,190 | A | * | 2/2000 | Oliver ........................ 718/107 |
| 6,032,216 | A | * | 2/2000 | Schmuck et al. ........... 710/200 |
| 6,052,731 | A | * | 4/2000 | Holdsworth et al. ........ 709/229 |
| 6,411,983 | B1 | * | 6/2002 | Gallop ........................ 709/104 |
| 6,748,481 | B1 | * | 6/2004 | Parry et al. ................. 711/100 |

* cited by examiner

*Primary Examiner*—Chun Cao
*Assistant Examiner*—Albert Wang
(74) *Attorney, Agent, or Firm*—Richard J. Gregson; Mark T. Starr; Woodcock Washburn

(57) ABSTRACT

An architecture for a read/write thread lock is provided for use in a computing environment where several sets of computer instructions, or "threads," can execute concurrently. The disclosed thread lock allows concurrently-executing threads to share access to a resource, such as a data object. The thread lock allows a plurality of threads to read from a resource at the same time, while providing a thread exclusive access to the resource when that thread is writing to the resource. The thread lock uses critical sections to suspend execution of other threads when one thread needs exclusive access to the resource. Additionally, a technique is provided whereby the invention can be deployed as constructors and destructors in a programming language, such as C++, where constructors and destructors are available. When the invention is deployed in such a manner, it is possible for a programmer to issue an instruction to lock a resource, without having to issue a corresponding unlock instruction.

31 Claims, 10 Drawing Sheets

ARCHITECTURE FOR A READ/WRITE THREAD LOCK

FIELD OF THE INVENTION

The present invention relates generally to the field of computer programming, and, more particularly, to the management of resources shared among computer programs, or portions of computer programs, that execute concurrently.

BACKGROUND OF THE INVENTION

Modern computing environments generally provide for multiple sets of computer instructions to execute concurrently. For example, a computing environment may permit a single program to spawn two or more "threads," where the threads execute in parallel, or two computer programs may execute concurrently under the control of a multi-tasking operating system. When the environment permits multiple sets of instructions to execute concurrently, it is frequently the case that these different sets of instructions need shared access to a resource, such as a data object. For example, two threads of a program may both need to read from, and write to, a data structure located within the program's address space, or two programs, each with its own address space, may share data through the operating system's file system.

A problem that arises when a resource is accessible to several threads that execute concurrently is that unpredictable, and sometimes disastrous, results can be produced if one thread is permitted to read from a resource while another thread is writing to that same resource. If reading and writing threads have simultaneous access to a resource, then the writer would be able to change the contents of the resource while the reader is in the process of reading the contents. For example, a resource could be a file of English text, and a program having a buffer that is only half the size of the text reads the file in two stages. If, between these two stages, a thread reading the file is interrupted by a writing thread that changes the contents of the file, then the portion read in the second stage may no longer correspond to the portion read in the first stage, resulting in the program receiving unreadable gibberish. As another example, a user-defined data structure could represent high-precision floating-point numbers, where the mantissa is stored in the first two words of the structure, and the exponent in the last two words. A software routine that performs an arithmetic operation (e.g., multiplication) on these numbers may read the mantissa and the exponent separately. If a thread reading the number is interrupted by a writing thread between the times that the mantissa and exponent are read, then the arithmetic operation will be performed on a number fabricated from the mantissa of the old value and the exponent of the new value. In all likelihood, this fabricated number will not represent any useful value.

One solution to the problem of concurrent access to a resource is to use a "locking/unlocking" mechanism. With such a mechanism, a portion of a computer program that accesses a data object begins with a "lock" instruction, which notifies other threads that the object is in use and should not be accessed by other threads. The portion of the code that needs to access the object concludes with an "unlock"instruction, which notifies other threads that the object is once again available for use. This solution, however, has drawbacks. First, the use of a general "lock/ unlock" mechanism is overbroad, in that it needlessly prevents multiple threads from reading an object simultaneously, even though the mischief caused by concurrent access is usually limited to the situation where a read and a write operation (or multiple write operations) are taking place at the same time. Second, a programmer who uses this mechanism must conscientiously include an "unlock" instruction corresponding to every "lock" instruction. If the programmer fails to unlock a data object that has been locked, the program will likely "freeze up" during execution, because other threads that require access to the object will not be able to proceed while the first thread has permanently tied up (locked) the object.

Various systems that address the problem of concurrent access to a resource permit several read accesses to take place at the same time, while allowing each write access to take place on an exclusive basis. Such systems are disclosed in the following U.S. Pat. No. 4,249,241 (Aberle, et al.); U.S. Pat. No. 5,161,227 (Dias, et al.); U.S. Pat. No. 5,226,143 (Baird, et al.); U.S. Pat. No. 5,285,528 (Hart); U.S. Pat. No. 5,454,108 (Devarakonda, et al.); U.S. Pat. No. 5,761,659 (Bertoni); U.S. Pat. No. 5,909,695 (Wong, et al.); U.S. Pat. No. 5,931,919 (Thomas, et al.); U.S. Pat. No. 5,940,828 (Anaya, et al.). However, these patents do not disclose that their systems are compatible for use with multiple threads in a single computer program, or in the other related contexts described herein.

In view of foregoing, there is a recognized need for a mechanism that overcomes the limitations and drawbacks noted above. No such mechanism has been realized in the prior art.

SUMMARY OF THE INVENTION

The present invention provides a novel architecture for a locking/unlocking mechanism. The locking/unlocking mechanism allows multiple threads to read a resource simultaneously, while granting a thread exclusive access to the resource if that thread is performing a write operation. Additionally, one embodiment of the disclosed locking/ unlocking mechanism permits the programmer to issue a "lock" instruction without needing to issue a corresponding "unlock" instruction.

A locking/unlocking mechanism in accordance with the invention permits a programmer to issue a "Lock/Access" instruction which indicates: (1) the resource to which the program needs access (e.g., a data location or file); and (2) whether the program needs access for the purpose of reading or for the purpose of writing. If the instruction indicates that the program needs to read the resource, then the locking/ unlocking mechanism grants access to the resource as long as no other thread is presently writing to the resource. If another thread is writing to the resource, then the mechanism waits until the writing thread is finished before allowing the reading thread to proceed. Checking whether other threads are using a resource, and, if necessary, waiting for those threads to finish using the resource, is accomplished by way of a critical section facility, such as one available from an operating system installed on the computer on which the threads are running, or by way of a non-operating-system facility implementing an equivalent functionality. Once the reading thread is permitted to proceed, a record is made of the threads that are presently reading the resource.

If the "Lock/Access" instruction indicates that the program needs to write to the resource, then the mechanism checks whether any other threads are presently writing the resource. If no other threads are writing the resource, then the mechanism permits the writing thread to proceed unless one or more other threads are reading from the same resource. While a thread is writing to a resource, it is preferred that no other thread be permitted access to the resource for any purpose—reading or writing.

In a presently preferred embodiment of the invention, the locking/unlocking mechanism is implemented as a class object in a C++ programming environment. In this embodiment, two classes are defined. One class maintains the "state" information for each resource, such as a count of the number of threads presently reading or writing the resource. A second class includes a "constructor" which checks the "state" object to determine if the requested access can be granted (and modifies the state accordingly, if access can be granted, e.g., by incrementing a count of readers). The second class also includes a "destructor," which updates the state accordingly when access has been completed (e.g., by decrementing the count of readers when a thread has finished reading). In C++, a "constructor" is a method associated with a class, which is called whenever an object of that class is created, and a "destructor" is another method associated with a class, which is called whenever an object of the class is destroyed. A typical use of a C++ embodiment of the invention is to open a scope (indicated by "{" in C++) for each portion of the code that needs to access a resource, and to declare a local data object of the second class within that scope. Declaration of the object causes the constructor to be called. All code that accesses the resource exists within the scope. When the scope is closed (indicated by "}" in C++), the destructor for the second class is called, thereby releasing the resource (e.g., by decrementing a count of readers or writers). Since the unlocking method is called when the scope is closed by means built-in to the C++ language, it is unnecessary for the programmer to issue a separate unlocking instruction for each lock, thus minimizing the chance of programmer error.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview in modern computing environments, it is frequently possible for several sets of computer instructions to execute at the same time. Many computing environments, such as an environment that includes a typical personal computer operating system, allow a user to have two or more computer programs running at the same time, where the two programs run in parallel. For example, a user may be playing a video game on a personal computer, while downloading a file from the Internet at the same time. Several operating systems, such as the MICROSOFT WINDOWS 95/98/NT/2000 family of operating systems, also have the capability for a single computer program to have two or more threads, where the threads execute concurrently. For example, a database application program might perform routine maintenance (e.g., sorting, garbage collection, etc.) at the same time that it permits a user to access the data. In this case, the user interface to the data could run on one thread, while the various maintenance routines could run on one or more other threads.

The problem addressed by the invention is presented when multiple sets of instructions (e.g., threads, processes, tasks, etc.) execute concurrently and have shared access to a single resource, such as a file, database, or data object. When two or more sets of instructions have shared access to a resource, it is sometimes, but not always, feasible or desirable for these different sets of instructions to access the resource at the same time. There is usually no harm if two threads (or tasks, processes, etc.) read from a resource at the same time, but, in general, no thread (or task, process, etc.) should read from a resource while another one is writing to it. The present invention provides a way for several sets of concurrently executing instructions to share access to a resource, performing their respective operations in parallel when possible, and performing them exclusively when exclusivity is necessary.

Figure 1:
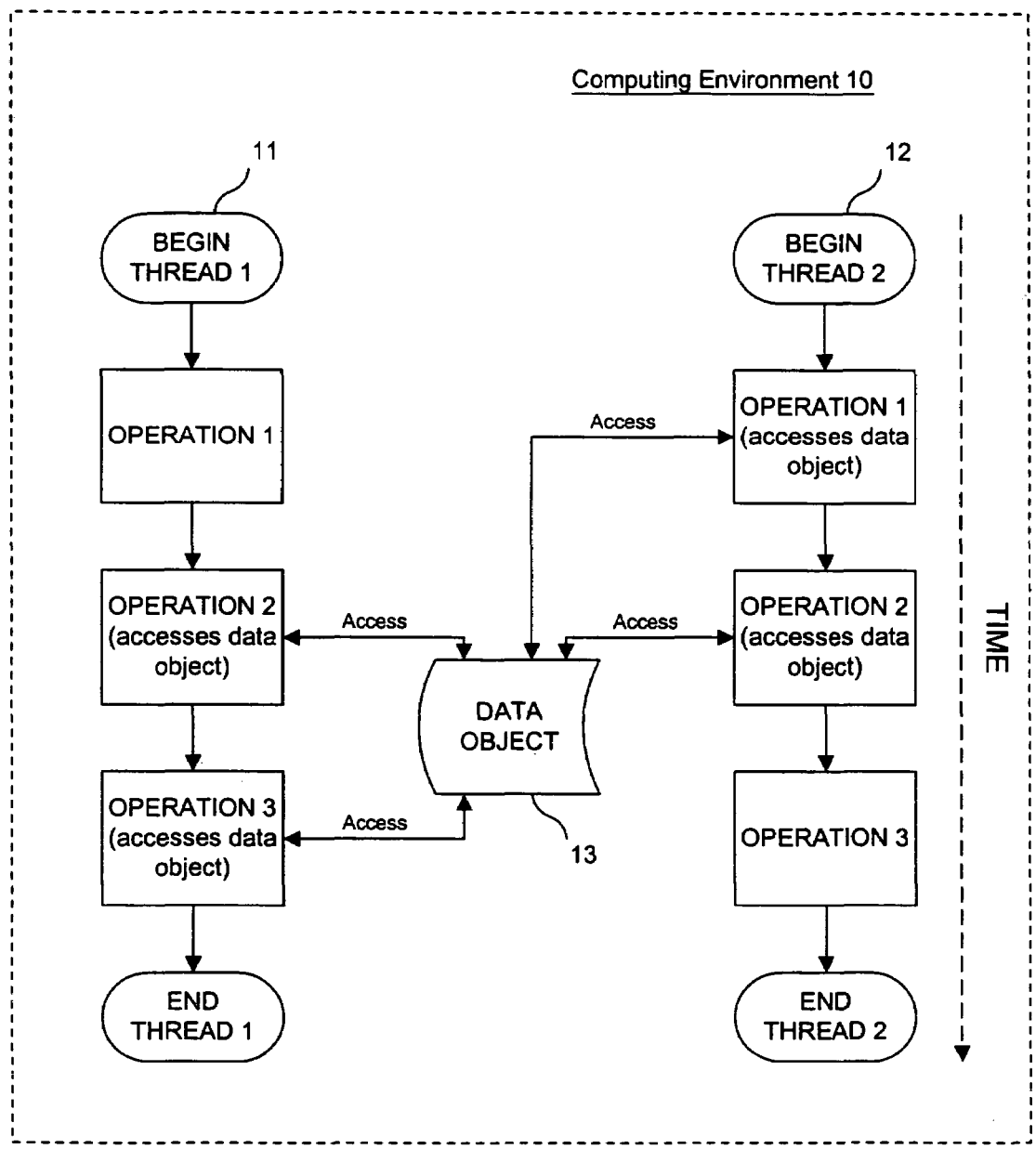
FIG. 1 is a block diagram showing a computing environment with multiple threads requesting access to a data object, in accordance with aspects of the invention.

Referring to the drawings, wherein like numerals are used to indicate like elements throughout, there is shown in FIG. 1 a computing environment 10, which exemplifies the problem addressed by the present invention. Computing environment 10 may include a single computer, such as a personal computer, mainframe computer, or handheld computer. It may include a group of computers, such as a group of servers that communicate with each other. It may include a distributed computing environment, comprising server computers, client computers, routers, and other computing devices that share resources and information through a computer network, such as a Local Area Network (LAN), Wide Area Network (WAN), or the Internet. Computing environment 10 comprises resources, such as data object 13. Data object 13 may be any type of structure capable of storing data. Examples of data object 13 include an item of data located within the address space of a single program (e.g., a global or local variable), or a file located somewhere within a filesystem accessible within computing environment 10. Data object 13 is merely exemplary, and not limiting, of the type of resource that may be managed by the present invention. A resource may be any object or device that can be read from and/or written to, such as a fixed or removable disk, magnetic tape, queue (such as a printer spool), buffer, data port, etc., or any object within such a resource (such as a single memory location within a larger buffer).

Within computing environment 10, threads 11 and 12 are executing concurrently. Threads 11 and 12 each comprise various "operations," which are instructions that a computing environment is capable of carrying out. The arrow alongside the flow of threads 11 and 12 shows the progression of time, and events shown in the same vertical position along the arrow should be interpreted as occurring at the same time. Threads 11 and 12 may be different threads of a single computer program running under an operating system that supports concurrent thread execution, such as the MICROSOFT WINDOWS 95/98/NT/2000 family of operating systems, in which case computing environment 10 would include such an operating system. It should be noted that, in the above-mentioned family of operating systems, the term "thread" generally refers to concurrently executing parts of a single computer program, wherein all parts of the program, including all of its threads, share a single address space. However, the term "thread," as used herein, is not so limited. Other examples of sets of instructions that can execute concurrently are processes in the UNIX operating system, tasks in the MICROSOFT WINDOWS 95/98/NT/ 2000 family of operating systems (unlike "threads" in that family of operating systems, "tasks" do not share a common address space), or different computer programs running on different computers in a distributed computing environment. While an implementation of the invention for use in the MICROSOFT WINDOWS 95/98/NT/2000 environment is provided below, which makes use of the common address space shared by different threads in a single program, it will be understood by those skilled in the art that there are numerous situations where computer instructions execute concurrently, and the invention applies to any such situation in which concurrently executing instructions can share access to a resource, whether or not the concurrently-executing instructions share an address space. For brevity's sake, the term "thread" is used throughout to refer to all such situations, except where context indicates otherwise. Where the term "thread" is used herein, it should be understood in this broad context.

As shown in FIG. 1, threads 11 and 12 both access data object 13. The depicted timing of operations in threads 11 and 12 exemplifies a typical situation in which two threads share access to a resource, in that some of the accesses occur at the same time, while others do not. "Operation 1" of thread 12 accesses data object 13 first. Thread 11 is not accessing data object 13 at that time, so no conflict arises in granting thread 12 access to data object 13. Similarly, "Operation 3" of thread 11 performs the last access to data object 13. Since thread 12 is not accessing data object 13 at that time, thread 11 is able to access data object 13 without conflict. However, both threads 11 and 12 have an "operation 2," which both attempt to access data object 13 at the same time. This situation can be approached either by allowing both threads 11 and 12 to access data object 13 at the same time, or by allowing one thread to proceed and requiring the other thread to wait until the first thread is finished accessing data object 13. Which solution is best may depend on what type of access each thread wants to perform. For example, if both threads needs to read data object 13, they may be permitted to access it at the same time for the purpose of reading. On the other hand, if thread 11 needs to write to data object 13 while thread 12 needs to read from it, then concurrent access may not be permissible, in which case one of the threads (e.g., thread 11) will be permitted to proceed with its "operation 2" first, while execution of the other thread (e.g., thread 12) is suspended until the first thread has concluded its "operation 2." The situation in which both threads need to write to data object 13 is generally approached in the same way as when one thread need to read and the other thread needs to write: one thread proceeds first, followed by the other thread.

It should be noted that it is possible for one thread (e.g., thread 11) to request access to a resource, such as data object 13, while a second thread (e.g., thread 12) is in the process of performing an access that lasts for a period of time. In this case, conflicting access requests would be resolved in the manner described above. If the two accesses can proceed concurrently (e.g., two read accesses), then thread issuing the later accesses request (e.g., thread 11) is permitted access while the first thread's (e.g., thread 12's) access is already underway. On the other hand, if the two accesses cannot proceed concurrently (e.g., a read access and a write access, or two write accesses), then one must be permitted to proceed while the other waits. Generally, the thread that has already begun access would be allowed to finish before the other thread proceeds. This result is preferable because interrupting one access with another could produce corrupt data. For example, if a thread has read only part of a resource at the time it is interrupted by a write access, when the reading thread resumes to read the remaining portion of the resource, the unread portion may have changed and may no longer correspond to the portion that has already been read. The result would be meaningless data fabricated from two unrelated states of the resource.

The present invention allows concurrently-executing threads to share a resource, while resolving conflicting requests to access the resource, such as those shown in FIG. 1. As discussed above, the present invention may resolve conflicts according to the following rules:

Multiple read accesses to a resource may proceed concurrently

A write access may not proceed while any other access is preceding, whether the other access is a read access or a write access, No access is ever interrupted What follows below is a description of the various components used in embodiments of the invention—critical sections, constructors, and destructors—and a preferred implementation comprising those components.

Critical Sections

One component used in creating a thread lock according to the invention is a "critical section." In computing environments in which multiple threads can execute concurrently, a critical section denotes a category into which certain portions of code may be placed, such that any code falling within that category (e.g., category A) must be executed to the exclusion of any other code within category A. Stated another way, if a first thread of a program has entered a particular "critical section" (e.g., critical section A), no other thread can enter critical section A until the first thread has left critical section A.

The MICROSOFT WINDOWS 95/98/NT/2000 family of operating systems provides a critical section facility for multithreaded programs. The facility defines a datatype called CRITICAL_SECTION, and four system calls: InitializeCriticalSection, EnterCriticalSection, LeaveCriticalSection, and DeleteCriticalSection. A programmer uses the facility by declaring one or more instances of the CRITICAL_SECTION datatype (labeled, for example, A, B, C, etc.), and issuing a system call of the form InitializeCriticalSection(&A) for each critical section to be used. For example, the call InitializeCriticalSection(&A) initializes the critical section named A. (The system call DeleteCriticalSection is the reciprocal of InitializeCriticalSection; it disables a critical section from use after the program no longer needs it.) When the programmer wishes to protect a section of code from simultaneous access by other threads, the programmer surrounds the code with EnterCriticalSection and LeaveCriticalSection system calls, such as in the following example C++ code fragment, which executes a "protected code segment" within critical section A:

EnterCriticalSection(&A);
//Protected code segment
LeaveCriticalSection(&A);

The system call EnterCriticalSection(&A) can be described as "claiming critical section A," and the system call LeaveCriticalSection(&A) can be described as "relinquishing critical section A." The significance of claiming and relinquishing critical sections is that if a first thread has claimed critical section A but has not yet relinquished it, then any other thread that attempts to claim critical section A (i.e., by issuing the system call EnterCriticalSection(&A)), will "hang" (i.e., will not proceed) until critical section A has been relinquished by another thread.

It should be observed that more than one critical section can be declared (e.g., A, B, and C mentioned above). Such multiple critical sections allow for the possibility that concurrently executing threads may have several classes of actions that may all be performed concurrently with respect to each other, whereas no two actions falling within the same class should execute at the same time. For example, a multi-threaded program may have two types of actions: type A and type B. An action of type A can proceed at the same time as an action of type B, but two actions of type A (or two actions of type B) cannot proceed at the same time. This scenario would be implemented by declaring two critical sections (e.g., A and B), and by surrounding actions of type A with calls to EnterCriticalSection(&A)/ LeaveCriticalSection (&A), and by surrounding actions of type B with calls to EnterCriticalSection(&B)/ LeaveCriticalSection(&B). In this scenario, if a first thread has claimed (and not yet relinquished) critical section A, the system call EnterCriticalSection(&B) issued by a second thread will not cause the second thread to "hang." However, once the second thread has claimed critical section B, the system call EnterCriticalSection (&B) issued by a third thread will cause the third thread to "hang," until critical section B has been relinquished.

Figure 2:
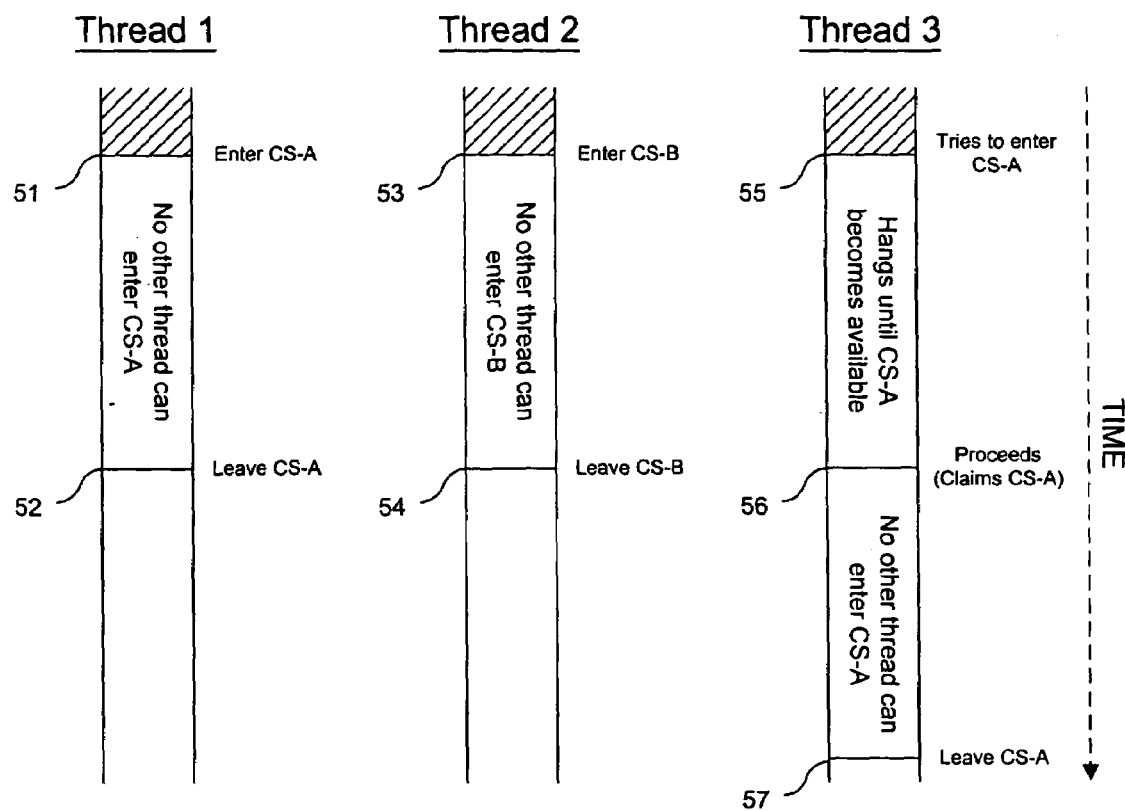
FIG. 2 is a flow diagram, showing the use of critical sections in accordance with aspects of the invention.

FIG. 2 shows an example of the use of critical sections within a program having three threads, thread 1, thread 2, and thread 3. FIG. 2 shows the execution of each thread proceeding as time progresses in the direction indicated by the arrow. Thread 1 claims critical section A at the point in time shown by reference numeral 51. At nearly the same time, thread 2 claims critical section B at the point in time shown by reference numeral 53. After thread 1 claims critical section A, no other thread can enter critical section A until thread 1 relinquishes it at the point in time shown by reference numeral 52. Also, after thread 2 claims critical section B, no other thread can concurrently enter critical section B until thread 2 relinquishes it at the point in time shown by reference numeral 54. However, thread 2 is able to enter critical section B during the time that section A is claimed by thread 1, because there is nothing to stop two threads from operating concurrently within two different critical sections. However, thread 3 attempts to claim critical section A at the point in time shown by reference numeral 55. At this time, critical section A is unavailable because it was already claimed by thread 1 at time 51, and, therefore, thread 3 "hangs" at least until the time shown by reference numeral 56 (which is immediately after the time shown by reference numeral 52, the time at which thread 1 relinquishes the A critical section). At time 56, thread 3 is able to claim critical section A and proceed with processing until it relinquishes critical section A at the time shown by reference numeral 57.

Figure 3:
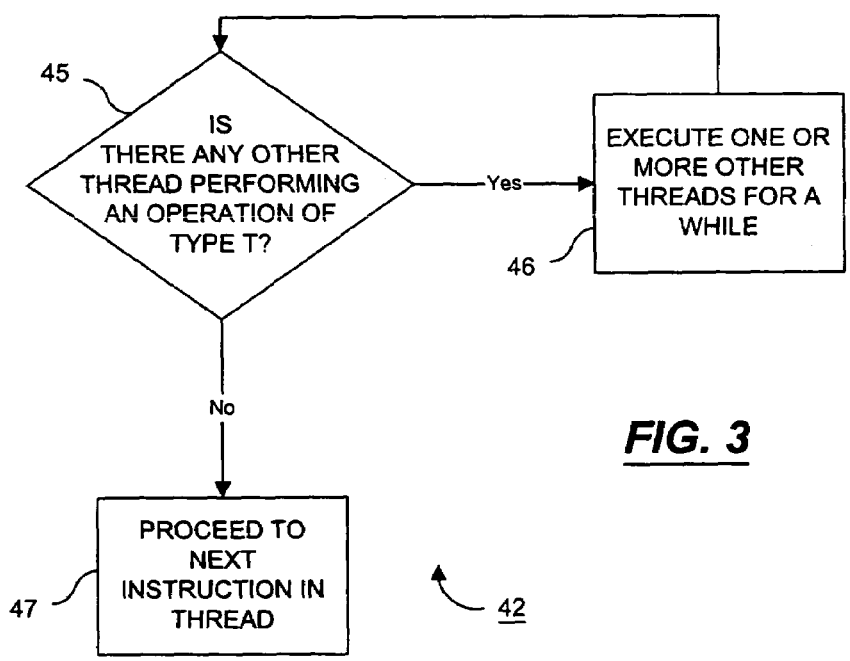
FIG. 3 is a flow diagram, showing the operation and functionality of a critical section, for use with aspects of the invention.

It will be appreciated by those skilled in the art that the critical section facility of the MICROSOFT WINDOWS 95/98/NT/2000 family of operating systems merely implements a particular function, which could also be user-implemented. FIG. 3 shows a "generalized" process of claiming a critical section 42, and it will be appreciated by those skilled in the art that the critical section facility of the above-mentioned family of operating systems is merely one implementation of the function of process 42. Specifically, the system call EnterCriticalSection(&T) is equivalent to the decisional step shown at block 45, wherein it is determined whether it is asked "is there any other thread performing an operation of type T?" If the answer to that question is "yes," the program proceeds to "execute another thread for a while" at block 46, eventually returning to block 45 to ask the question again. During the execution of another thread at block 46, the thread that attempted to claim critical section T "hangs" (i.e., suspends execution) while one or more other threads execute. In a typical computing environment that provides for switching between concurrently-executing threads, the amount of time during which the "other thread" executes at block 46 before returning to block 45 may be unnoticeable to the user—perhaps only a matter of microseconds—although the functionality depicted in FIG. 3 is not limited to such rapid thread switching. If, at block 45, it is determined that no other thread is performing an action of type T, then the thread making the inquiry proceeds to block 47 to continue with its next instruction. Block 47 corresponds to the instructions (e.g., C++ program statements) that would follow the system call EnterCriticalSection(&T) (i.e., those instructions that should be executed only after critical section T has been claimed).

The specific implementation of the invention provided below makes use of the critical section facility of the MICROSOFT WINDOWS 95/98/NT/2000 family of operating systems. That facility is specifically limited to the case wherein the concurrently executing sets of instructions are, in fact, threads of a single computer program sharing a common address space. This is so, because the critical section facility of the above-mentioned family of operating systems requires that threads managed by it share information through a CRITICAL_SECTION data object, which is, by definition, an item of data located within the address space of one program. However, it should be appreciated that the functionality shown in FIG. 3 can be implemented without requiring that information be shared by way of a single program's address space. On the contrary, processes with different address spaces could share information about whether one of the processes had claimed a critical section through an interprocess communication mechanism or through a filesystem accessible to both processes. Two programs executing on different computers could share information through a communication link, or by exchanging information through a network server. It should be apparent to those skilled in the art that the invention provided herein can be implemented using the generalized critical section process 42, rather than the critical section facility of the MICROSOFT WINDOWS 95/98/NT/2000 operating systems.

Constructors and Destructors

A preferred embodiment of the invention makes use of data objects (sometimes referred to simply as "objects") having "constructors" and "destructors." A constructor is a procedure associated with an object, wherein the procedure is invoked when an instance of the object is created. A destructor is a procedure associated with an object, wherein the procedure is invoked when an instance of the object is destroyed. An instance of an object is said to be "created" at the time that memory is allocated to store the object. An instance of an object is said to be "destroyed" at the time that the memory for the object is deallocated.

The disclosed implementation of the invention makes use of the constructor/destructor facility of the C++ programming language. C++ provides the ability for a programmer to define a "class," which is a type of data object. A class may comprise various types of data, such as integers, characters, floating-point numbers, arrays of the above-mentioned data types, or pointers to the above-mentioned data types. A class may also comprise, or be associated with, one or more "methods." A method is a defined set of computer-executable instructions. A C++ class may contain a constructor method and a destructor method. A compiler for the C++ language inserts code to invoke the constructor (and destructor) methods whenever an instance of the class is created (or destroyed).

An instance of a class is said to be "created" when a location is allocated for its storage in the execution space of the program. Likewise, an instance of a class is said to be destroyed whenever the space allocated for that instance is deallocated. One example of the creation and destruction of class instances is the case in which class instances are declared as local data. Local data is said to exist within a "scope." Local data is created at the time the program enters the scope, and it is destroyed at the time the program leaves the scope. An example of the creation and destruction of data is described with reference to Table 1 and FIGS. 4A–4C.

TABLE 1

| L1: | void ExampleMethod( ) |
| L2: | { |
| L3: | MyClass a; |
| L4: | { |
| L5: | MyClass b; |
| L6: | MyMethod(&b); |
| L7: | } |
| L8: | MyMethod(&a); |
| L9: | } |

Table 1 contains an example portion of a program, written in the C++ programming language, which demonstrates the use of local data. MyClass is a user-defined class; MyMethod is a user-defined method; and void is type designator native to the C++ language, which, in the context used in Table 1, simply indicates that the method ExampleMethod returns no value to its caller. The designators L1 through L9 identify lines of the program for the reader's reference, and are not part of the program.

Referring to the example shown in Table 1, a new method, named ExampleMethod, is declared at line L1. As the method ExampleMethod proceeds to execute, the character "{" at line L2 causes ExampleMethod to enter its first local scope. At line L3, an instance of the user-defined class MyClass is declared within the first local scope. The declared instance of MyClass is labeled "a". At this time, the constructor for MyClass is executed. By convention in the C++ programming language, the constructor for MyClass is named "MyClass::MyClass( )." The instructions that MyClass::MyClass( ) comprises are defined elsewhere, along with the other components of MyClass. At line L4, ExampleMethod enters a second local scope. Within the second local scope, a second instance of MyClass, labeled "b", is declared at line L5. At the time that the second instance of MyClass labeled "b" is declared, the constructor for MyClass is once again executed. At line L6, the user-defined method MyMethod is invoked. In the example, MyMethod receives a pointer to the instance of MyClass labeled b. MyMethod may perform some operation on the instance of MyClass labeled b, although the actual operation performed by MyMethod is unimportant for the purpose of this example. At line L7, the second local scope of ExampleMethod is closed. At that time, the instance of MyClass labeled b is destroyed, so the destructor for MyClass is invoked. By convention in the C++ programming language, the destructor for MyClass is named "MyClass::~MyClass( )," and, like the constructor for MyClass, it was defined elsewhere along with the other components of MyClass. At line L8, MyMethod is invoked again, this time with a pointer to the instance of MyClass labeled a as its parameter. At line L9, the first local scope of ExampleMethod is closed. At that time, the closing of the first local scope causes the instance of MyClass labeled a to be destroyed, thereby causing the destructor for MyClass to be invoked again. Execution of ExampleMethod concludes at that time.

Figure 4C:
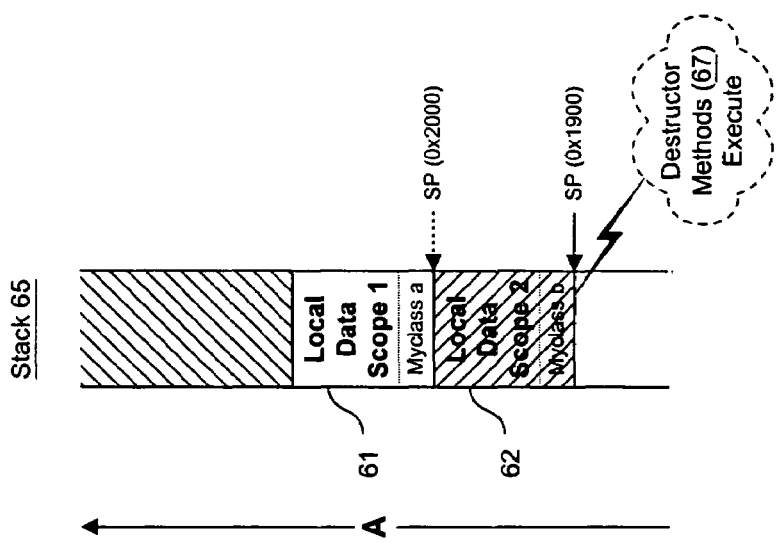
FIGS. 4A–4C show various states of a program stack having local data of different scopes, as used in aspects of the invention.
Figure 4B:
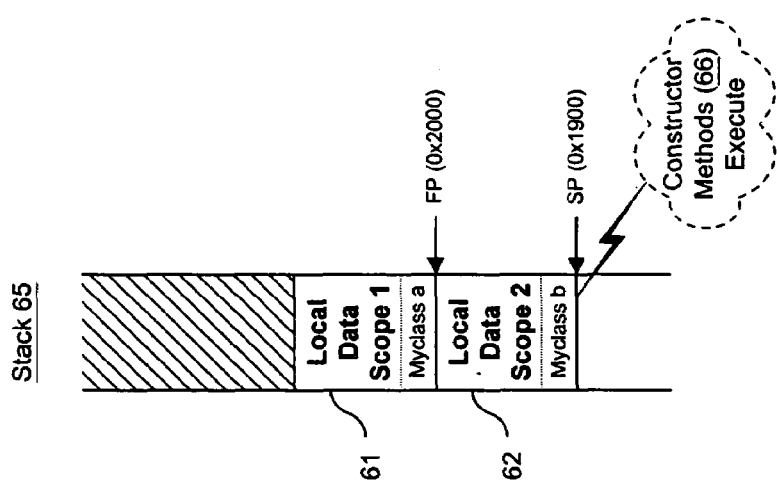
Figure 4A:
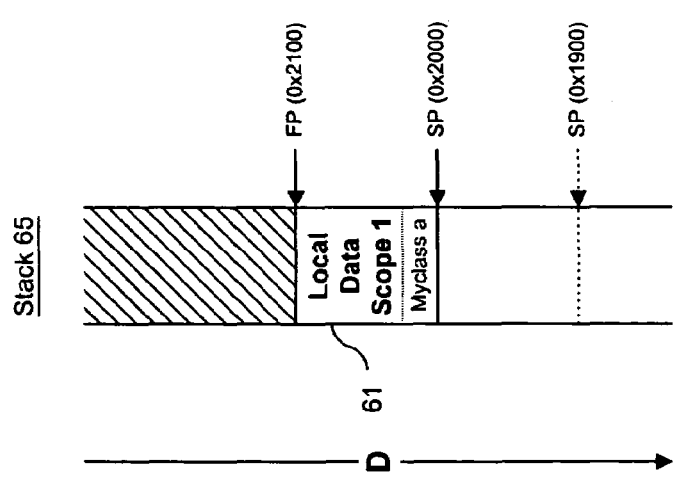

The concept of creating and destroying local data such as class instances can be more fully appreciated in connection with its usual implementation on a program stack, which is a block of memory used during the execution of a program. FIGS. 4A–4C show a typical program stack 65 as it might exist as various stages of the execution of the program shown in Table 1. Local data used by the program is typically stored on the stack. The physical location of such data within the computer on which the program is running is expressed as an offset (i.e., distance in bytes) from the "stack pointer" (or "SP"), which is typically a register that contains the address of the "end" of the stack—that is, the "last" point on the stack to which program data has been allocated. A typical stack grows "downward" (i.e., from a high-numbered memory location to a low-numbered memory location, shown in FIG. 4A by the direction D of the arrow), so the stack pointer typically contains the address of the lowest-numbered memory location that is in use for stack data. A typical implementation of a stack may also comprise a "frame pointer" (or "FP"), which may be another register that contains the previous value of the stack pointer—that is, the address of the previous "end" of the stack before the most recent local data was added to it. (The area in between the frame pointer FP and the stack pointer SP, wherein the local data in the most recently opened local scope resides, is called the current "frame.")

FIG. 4A shows the state of program stack 65 just before the program of Table 1 enters its second local scope at line L4. The frame pointer FP is set to the address 0x2100, and the stack pointer is set to 0x2000. The area in between FP and SP is the current frame, which corresponds to the first local scope in the program of Table 1. The instance of MyClass labeled a is located on the stack within the current frame at the location referenced by numeral 61. In the example depicted, the local instance of MyClass does not occupy the entire current frame, as the current frame may also contain "bookkeeping" information related to the current frame (such as the location of, and parameters for, any destructor methods to be executed when the current frame is popped). Upon entry of a second local scope and declaration of a new local instance of MyClass, at lines L4 and L5, the stack 65 is pushed "down" (in the descending direction indicated by the direction D of the arrow) by 0x100 (256 in decimal) to the location 0x1f00. In FIG. 4B, a new frame has been added corresponding to the second local scope in the program of Table 1. Included within this scope, as shown by reference numeral 62, is the instance of MyClass labeled b, which was declared at line L6. (As with the previous frame, the new instance of MyClass is not shown as occupying the entire frame, as there may be other "bookkeeping" data within the frame.) At the time that the b instance of MyClass is placed on the stack 65, constructor methods 66, including the constructor method for MyClass, is invoked. After the second local scope has been entered, and space for its local data allocated on the stack 65, the new state of the stack 65 is shown in FIG. 4B, and it will be observed with reference to that figure that the stack pointer SP is now set to 0x1f00, and the frame pointer FP is set to the previous value of the stack pointer, or 0x2000. FIG. 4C shows stack 65 immediately before the second local scope in the program of Table 1 exits at line L7. When the scope exists, the stack 65 will be "popped" to its previous position shown in FIG. 4A, by resetting the stack pointer SP to 0x2000 and the frame pointer FP to 0x2100 (their respective values shown in FIG. 4A before the second local scope was entered). The direction A ("ascending") of the arrow shows the direction in which the stack pointer SP will move to pop the stack. Once the stack 65 has been popped, the location reserved for the b instance of MyClass will be beyond the "end" of the stack, thereby signifying its destruction. At that time, destructor methods 67, including the destructor for MyClass, are invoked.

It should be noted that the execution of the constructor and destructor routines is not normally actuated by the movement of the stack pointer itself. Rather, a programming environment that supports constructors and destructors in connection with local data, such as the C++ programming language, links the declaration of data with the invoking of the constructor methods for that data, and the popping of the stack with the invoking of the destructor routines for any data residing on the stack within the frame being popped. For example, where an instruction to close a local scope exists in a program (such as those shown at lines L7 and L9 in Table 1), the compiler generates the code necessary to pop the stack, as well as the code necessary to invoke the destructor routines for any local data that will be destroyed as a result of the popping event.

As can be appreciated from the above example, the use of constructors and destructors provides a convenient way to surround a segment of code with two methods. For example, there may be an "initialization" method, which needs to be performed before executing a particular code segment, and a "clean-up" method, which needs to be performed after executing that code segment. A class may be defined, with the initialization method provided as the constructor for the class and the clean-up method provided as the destructor for the class. Whenever a programmer writes a code segments for which the initialization and clean-up methods need to be performed, the code segment can be enclosed within a local scope in which an instance of the class is declared. For example, if MyClass has its constructor defined as an initialization method and its destructor defined as a cleanup method, then a convenient way to enclose a segment of code between the initialization and cleanup methods is shown in Table 2:

TABLE 2

| L1: | { |
| L2: | MyClass a; |
| L3: | // segment of code to be enclosed |
| L4: | } |

In Table 2, the declaration of an instance of MyClass at line L2 causes the constructor for MyClass (or "initialization" routine) to be executed before performing the instructions at line L3. The closing of the scope at line L4 causes the corresponding destructor (or "cleanup" routine) to be executed. It is possible to achieve the same result simply by defining two methods (for example, named open ( ) and close ( ), and by the programmer explicitly issuing explicit calls to open ( ) and close ( ) at the beginning and end, respectively, of the code segment at issue. However, one advantage of using the technique shown in Table 2 is that it is difficult for the programmer to forget to invoke a close method corresponding to each open method. The programmer simply opens a local scope and declares an instance of the class containing the "open" method as its constructor. The compiler then automatically inserts the "close" method destructor where the local scope ends. If the programmer forgets to close the scope, a compile-time error results which must be fixed before the program can be compiled.

C++ is merely one language that provides constructors and destructors. The key concept is not the specific use of the C++ language, but rather a programming environment in which data objects can be defined to comprise or reference: (1) a set of instructions to be executed when an instance of the object is created; and (2) a set of instructions to be executed when an instance of the object is destroyed. Where the implementation of the invention described herein makes use of constructors and destructors in C++, it will be appreciated by those skilled in the art that the invention can easily be implemented with a similar facility in a different programming environment, and such implementations are within the scope and spirit of the invention. Moreover, the concepts of creating and destroying data are not limited to the stack implementation depicted in FIGS. 4A–4C, but encompass any equivalent concept in which data can be created and destroyed.

A Preferred Implementation of the Invention

The invention may be implemented in a variety of ways and used in a variety of computing environments, without departing from its spirit and scope. In a preferred embodiment, the invention is implemented in a computing environment that comprises the C++ programming language. In another preferred embodiment, the invention is implemented in a computing environment that comprises one of the operating systems in the MICROSOFT WINDOWS 95/98/NT/2000 family of operating systems. More preferably, the invention is implemented in, and designed for use in, a computing environment comprising both the C++ programming language and one of the operating systems in the MICROSOFT WINDOWS 95/98/NT/2000 family of operating systems. The text and accompanying figures that follow provide a preferred implementation of the invention using the elements discussed above in a computing environment comprising both the C++ programming language and one of the operating systems in the MICROSOFT WINDOWS 95/98/NT/2000 family of operating systems. It will be appreciated by those skilled in the art of computer programming, however, that the disclosed implementation is but one possible implementation of the invention, and other implementations are within the spirit and scope of the invention.

The implementation of the present invention that is provided herein makes use of constructors and destructors provided by the C++ programming language and the critical section facility of the MICROSOFT WINDOWS 95/98/NT/2000 family of operating systems. Specifically, the implementation provided uses a class constructor as a "lock" instruction and a class destructor as an "unlock" instruction. The disclosed implementation uses three critical sections for each resource to be protected by a lock. Finally, the disclosed implementation uses two counters (i.e., integer variables that are either incremented or decremented).

The disclosed implementation defines a class called CRWLock, which comprises two public methods, CRWLock::LockData(LockType lt) and CRWLock::UnLockData (LockType lt). LockData( ) and UnLockData( ) each accept a parameter of the type LockType, which is an enumerated type defined within the CRWLockAccess class that can be either ReadLock or WriteLock, depending on whether a thread needs a read lock or a write lock, respectively. The constructor for the CRWLock class (by convention, named CRWLock::CRWLock), initializes three critical sections, MAIN, WRITE, and READ. Each instance of the CRWLock class has an instance of each of these three critical sections. The purpose of each critical section is discussed below. Each instance of the CRWLock class also has two counters, called READERS and WRITERS, respectively, which are each initialized (i.e., set to zero) by the CRWLock class constructor. The READERS and WRITERS counters keep track of the number of threads that are presently reading or writing the resource protected by an instance of CRWLock. (In accordance with an aspect of the invention, only one thread can write to a resource at a given time, so the value of WRITERS should never be anything except zero or one unless an error occurs, but, for convenience, WRITERS is implemented as a counter rather than as a two-state datatype.)

Figure 5:
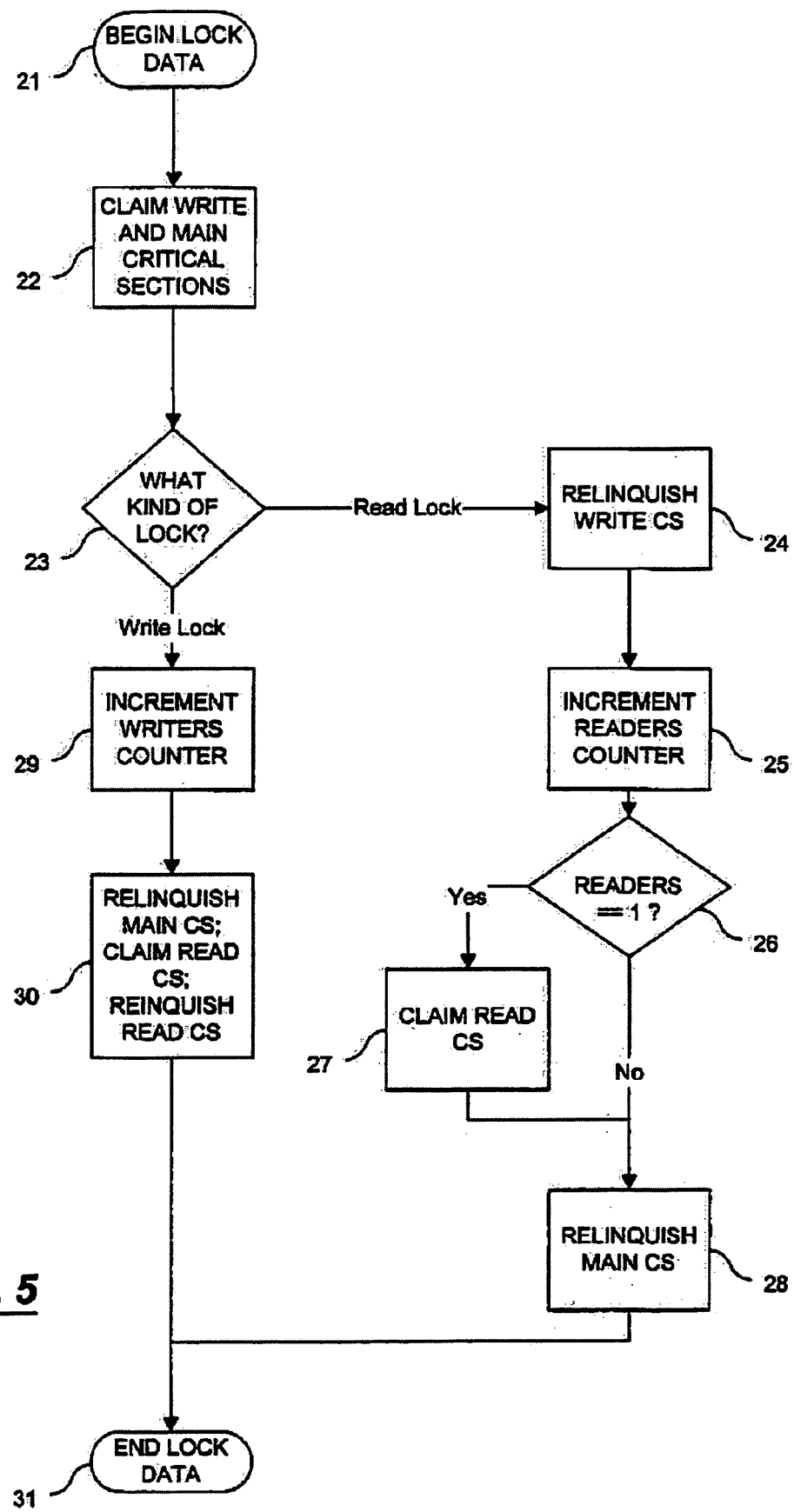
FIG. 5 is a flow diagram, showing the processing of a request for a lock on a resource, in accordance with a preferred embodiment of the invention.

With reference to FIG. 5, the process is now described by which a thread uses the CRWLock object to evaluate a lock request in accordance with an aspect of the invention. At the point of entry to the flowchart in FIG. 5 (block 21), it is assumed that a resource has been identified that needs to be protected by a lock, and that an instance of the CRWLock class has been created for that resource, where the said instance of CRWLock is associated with instances of the three critical sections and two counters mentioned above. The references to critical sections and counters in FIG. 5 (and with respect to the unlocking process show in FIG. 6), are to the instances of those critical sections and counters associated with the single exemplary instance of CRWLock mentioned above.

Referring to FIG. 5, at block 21, the process of evaluating a lock request begins by a thread issuing an appropriate instruction to request a lock, indicating the type of lock—read or write—the thread needs to acquire. As discussed below, in the embodiment provided herein the programmer may initiate the process of requesting a lock by declaring a local instance of a class, wherein the lock request is issued by the class constructor. (The class used for such an implementation is different from the CRWLock class; the specifics of this second class are described below.) At block 22, the thread first claims the WRITE critical section and then claims the MAIN critical section. The WRITE critical section will be available to the thread, unless another thread is presently writing to the resource. (Since all lock requests commence by claiming the WRITE critical section, it is also possible that the WRITE critical section is unavailable because it has been claimed by a thread that is in the process of requesting a read lock. However, as explained below in connection with block 24, such a thread would relinquish the WRITE critical section in a very short amount of time, thereby making it available to the thread depicted in FIG. 5.) It will be observed that the thread claims the WRITE critical section regardless of whether it is requesting a read lock or a write lock. The reason for doing so is that if another thread presently has a write lock (and, therefore, has claimed the WRITE critical section), then it is impossible to grant any type of lock to another thread (since, in the present invention, a write operation involving a resource excludes any concurrent read or write access to that resource), so the thread should just "hang" until whichever thread claimed the WRITE critical section has relinquished it. At block 22, after the thread claims the WRITE critical section (possibly after waiting for it to become free), it also claims the MAIN critical section.

The MAIN critical section is claimed by a thread that is in the process of obtaining a lock. Its purpose is to protect the "state" data (i.e., the counters and critical sections) from being modified by another thread, while the present thread uses that data to evaluate the lock request. The MAIN critical section is released by the locking and unlocking methods when there is no longer a need to protect state data from other threads that are processing lock and unlock requests. It will be appreciated by those skilled in the art that the implementation provided herein is for use in an environment where an authority beyond the control of the threads themselves (i.e., the operating system) rapidly switches control from one thread to another. In such an environment, it is possible for the operating system to switch control between two threads, both of which are processing lock requests. It is the function of the MAIN critical section to atomize the locking and unlocking processes so that the state data cannot be corrupted by the unpredictable interaction between the lock and unlock requests of two different threads. For example, if there were no MAIN critical section, then two threads might issue lock requests and concurrently progress through block 25. If no other lock is outstanding at the time requests are issued, then, by the time both threads have performed block 25, the value of READERS will be two. Since both threads will conclude at block 26 that the value of READERS two, neither will claim the READ critical section at block 27, although, as discussed below, it should be claimed in order to block concurrent writing threads. It can be appreciated that it may be possible to implement the invention in such a way that the state data is adequately protected by the READ and WRITE critical sections, or in which the locking and unlocking mechanism have other means to deal with unpredictable interaction between multiple threads performing locking and unlocking operations. In such an implementation, the use of a MAIN critical section would be unnecessary.

At block 23, the type of lock requested by the thread is evaluated. If a read lock has been requested, the flow proceeds to block 24. If a write lock has been requested, the flow proceeds instead to block 29.

If a write lock has been requested, then, at block 29, the thread increments the WRITERS counter, which maintains a count of the number of threads presently writing to the resource. The WRITERS counter should never have a value higher than one; the use of incrementing and decrementing operations (FIG. 6, block 38) is merely a convenient way of toggling the value of WRITERS between zero and one. As shown in FIG. 5, a thread is never allowed to proceed to the incrementing step at block 29 when a second thread is presently writing to the protected resource, because that second thread would still hold claim to the WRITE critical section, and, therefore, the thread requesting a write lock would not proceed past block 22 until the second thread has finished writing and relinquished the WRITE critical section. Therefore, the value of WRITERS can never be incremented to a value higher than one. After incrementing the WRITERS counter, the thread proceeds to block 30.

At block 30, the thread relinquishes the MAIN critical section. The MAIN critical section can be relinquished at this point because there is no longer a need to protect the state data from modification by other threads. The only remaining actions, claiming and relinquishing the READ critical section, cannot be interfered with by another thread, since the only point at which another thread can try to claim the READ critical section is at block 27. However, since the present thread has just released the MAIN critical section, no other thread could be at block 27, since any other thread processing a lock request would have been "hanging" at block 22, waiting for the MAIN critical section to be relinquished.

Following the relinquishment of the MAIN critical section, the thread claims the READ critical section and then relinquishes it. The purpose of claiming the READ critical section is to test whether another thread is presently reading the protected resource. It will be observed that, until block 30, the thread has ascertained only that no other thread is writing to the resource, and there has been no attempt to determine whether another thread is presently reading the resource. If another thread is presently reading the resource, then the attempt to claim the READ critical section will cause the thread to "hang" until all read locks have been released. (As discussed below in connection with FIG. 6, the READ critical section is relinquished by the last thread that releases a read lock.) Since the purpose of claiming the READ critical section at block 30 is merely to check whether the READ critical section has been claimed elsewhere, the thread relinquishes the READ critical section immediately after it claims it. At that point, the thread has successfully obtained a write lock on the protected resource, so the process of evaluating the lock request ends at block 31, at which point the thread proceeds with instructions that perform writing operations on the resource.

Returning to decisional block 23, if it is determined that a read lock instead of a write lock is requested, then the flow proceeds to block 24. Since a read lock has been requested instead of a write lock, the thread does not need to keep the WRITE critical section and therefore relinquishes it at block 24. At block 25, the thread increments the READERS counter. At any given time, the READERS counter indicates the number of threads that are presently reading the protected resource. Since more than one thread can read a resource concurrently, the READERS counter, unlike the WRITERS counter, can hold a value higher than one. At decisional block 26, the READERS counter is evaluated to determine whether it is equal to one. The purpose of this evaluation is that, if the value of READERS is one, then no other thread presently holds a lock on the resource, which means that the READ critical section is presently unclaimed. In this case, it is necessary to claim the READ critical section (so that a second thread requesting a write lock will "hang" at block 30 until all read locks have been released). Therefore, if the value of READERS is one, the thread proceeds to block 27 to claim the READ critical section, and then proceeds to block 27. If the value of READERS is other than one, then the thread depicted in FIG. 5 is not currently the only reader, so the READ critical section has already been claimed by another thread. In this case, the flow of the thread proceeds directly from block 26 to block 28. It should be noted that, if another thread has already claimed the READ critical section, then it is impossible (and unnecessary) for the present thread to claim it. Any attempt to issue the instruction EnterCriticalSection(&READ) will simply cause the later reading thread to "hang"; this is not the desired result, since the second reading thread should be able to proceed with instructions to read the resource concurrently with the first reading thread. The primary function of the READ critical section is to ensure that a request for a write lock will not proceed past block 30 if one or more threads is reading the protected resource, and the fact that one thread has claimed the READ critical section is sufficient to ensure that outcome.

At block 28, the MAIN critical section is relinquished, as the processing of the lock request has finished using the state data and no longer needs to protect it from other threads. The flow of the thread then proceeds to block 31, at which point the evaluation of the lock request is completed, and the thread proceeds with operations that manipulate the resource.

At this point, two observations should be made. First, is should be noted that lock requests are never "denied" by the implementation provided herein. That is, a thread is never informed that its lock request cannot be granted. Instead, when a lock request cannot be granted because it is inconsistent with some other outstanding lock on the same resource, the thread simply "hangs" until the lock request can be granted. This "hanging" is accomplished by the thread issuing an "EnterCriticalSection," instruction and having to wait for a critical section to become available (at either block 22, block 27, or block 30). (The thread must wait at least until the awaited critical section becomes available, but may not even be able to proceed at that time. If two threads are waiting for the same critical section, then one thread will claim it when it first becomes available, and the other thread will have to wait longer; however, if two threads are waiting for the same critical section, it is not necessarily the case that the first one to issue the request will claim it first.)

Second, it should be apparent that there is no limit on what type of instructions may be contained in the thread following the granting of a lock at block 31. The present invention provides a mechanism by which a lock on a resource can be obtained for the purpose of reading from or writing to a resource, but it is up to the programmer to determine that a set of instructions requires a lock, and, if a lock is required, whether it should be a read lock or a write lock. In general, characterization of instructions as reading instructions or writing instructions will be clear-cut, but it should be appreciated that there is no requirement that writing instructions actually follow the granting of a write lock, or that reading instructions actually follow the granting of a read lock. A program, for example, could request a write lock to temporarily block all access to a resource (for some reason other than that the thread needs to write to the resource), even if the thread obtaining the lock contains no instructions to write to the resource. Likewise, a program could request a read lock to temporarily prevent modification to a resource, even if the thread requesting the lock does not actually read from the resource.

Figure 6:
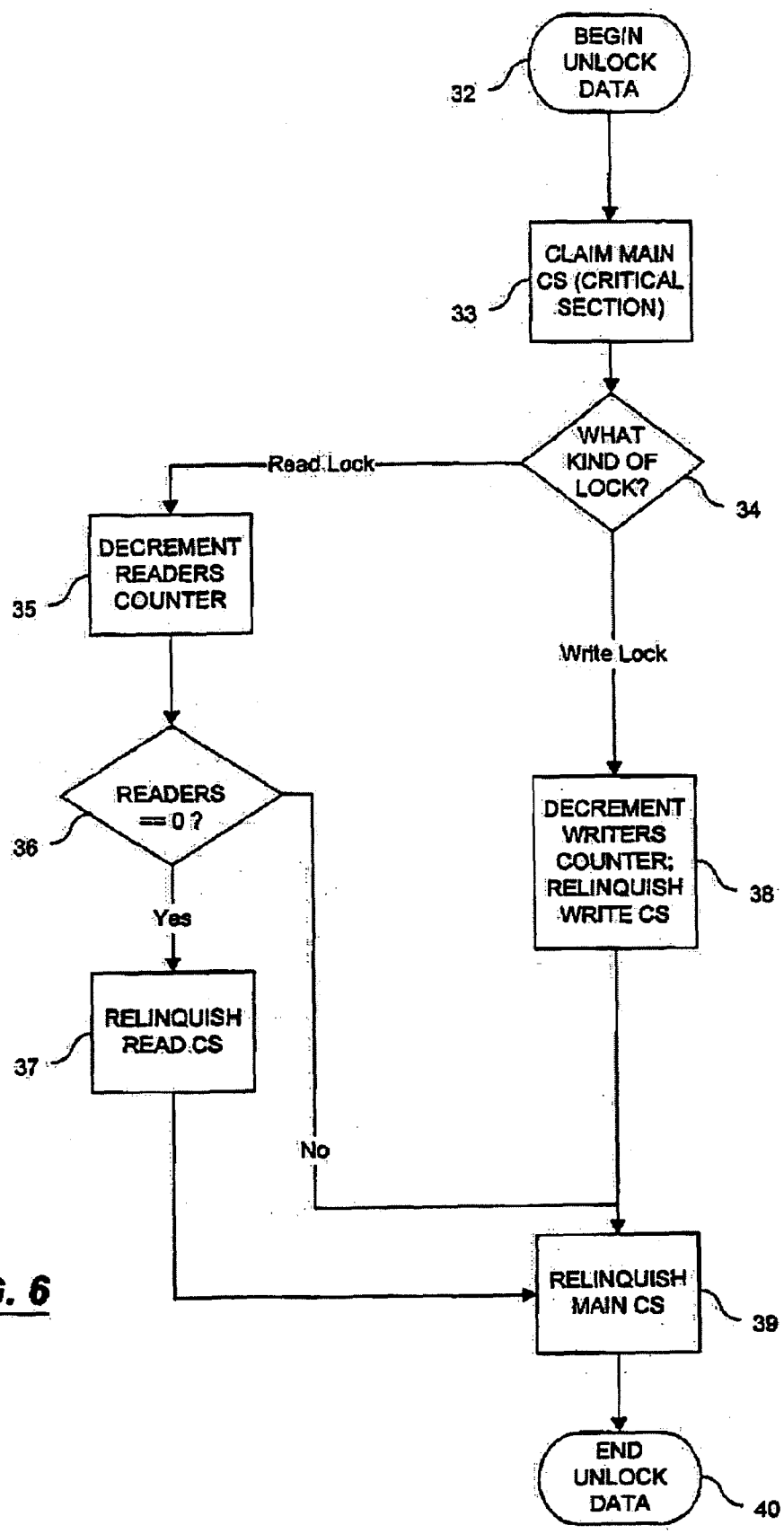
FIG. 6 is a flow diagram, showing the processing of a request to of unlock a previously locked resource, in accordance with a preferred embodiment of the invention.

Referring now to FIG. 6, the process shall be described by which an unlock request is evaluated. At block 32, the thread issues a request to unlock a resource. As discussed below, in a preferred embodiment of the invention, a class destructor could be used to issue the unlock request, so the programmer does not need to issue the request explicitly.

At block 33, the thread claims the MAIN critical section. As discussed above, the purpose of claiming the MAIN critical section at this point is to protect the state data from modification by other threads while the present thread is processing the unlock request. At decisional block 34, it is determined whether the lock to be released by the "unlock" instruction is a read lock or a write lock.

If the lock to be released is a read lock, then the flow proceeds to block 35, where the READERS counter is decremented. It will be recalled that value of the READERS counter at any given point in time is the number of threads that are presently reading the protected resource. At decisional block 36, it is determined whether the value of READERS is zero. If READERS is not zero, then there is still another thread reading the protected resource. In that case, the READ critical section cannot be relinquished, and the flow proceeds to block 39. On the other hand, if READERS equals zero, this indicates that the thread is the last thread that had a read lock on the resource. Since there are no other threads reading the resource (and, therefore, no reason to prevent other threads from acquiring a write lock), the thread relinquishes the READ critical section at block 37. It will be observed that, in the case where multiple threads concurrently hold a read lock, the thread that issues the instruction to relinquish the READ critical section at block 37 may not be the same thread that claimed it at block 27. The critical section facility of the MICROSOFT WINDOWS 95/98/NT/2000 family of operating systems permits one thread to relinquish a critical section (i.e., to issue the system call LeaveCriticalSection(&READ)) even if that thread is not the thread that claimed that critical section (i.e., is not the same thread that issued the corresponding EnterCriticalSection (&READ) system call). Similarly, when the invention is implemented outside of the above-mentioned operating system environment (e.g., by a software module that implements the functionality depicted in FIG. 3), it is likewise unnecessary for the thread relinquishing the READ critical section at block 37 to be the same thread that claimed it at block 27. After the READ critical section is relinquished at block 37, the flow proceeds to block 39.

Returning to decisional block 34, if the lock to be released is a write lock, the flow proceeds to block 38, where the WRITERS counter is decremented and the WRITE critical section is relinquished. At block 38, prior to decrementing WRITERS, the value of WRITERS is equal to one. This is so, for the following reasons. First, the value of WRITERS must be at least one, because the fact that a write lock is being released means that, at some time in the past, the write lock was granted by incrementing WRITERS to the value one at block 29. Second, the value of WRITERS cannot be greater than one, since, as discussed above, the unavailability of the WRITE critical section to a second thread while a first thread is writing will prevent a second thread from progressing to block 29 (where the WRITERS counter is incremented) until the writing thread releases its lock. Therefore, the step of decrementing the WRITERS counter at block 38 should simply toggle the WRITERS counter from one to zero. It will be appreciated that any toggling mechanism may be used in place of the WRITERS counter.

At block 38, the WRITE critical section is also relinquished. It should be recalled that every request for a lock commences by claiming the WRITE critical section at block 22. Therefore, the significance of relinquishing the WRITE critical section at block 38 is that it permits any pending lock requests to proceed, which would otherwise have been "hanging" up to the time that the WRITE critical section is released at block 38.

At block 39, where the divergent processes for unlocking read and write locks meet up once again, the MAIN critical section is relinquished. The process of releasing a lock then concludes at block 40, where the thread unlocking the resource proceeds with whatever instructions follow the unlocking action.

As noted above, the invention can be deployed in a class object for use in the C++ programming language, so that a programmer need not issue a unlock instructions explicitly. This deployment can be performed in the following manner.

For each resource that the programmer wishes to protect by a lock, the programmer declares an instance of the CRWLock class. The programmer does this by issuing an instruction, such as:

CRWLock MyLock;

The instance of CRWLock should be of a scope that is at least coextensive with the existence of the resource to be protected by the lock. For example, if the resource to be protected is a local variable of the highest level local scope, then the instance of CRWLock should also be of the highest level local scope, but may be of a higher scope, such as a global variable. The declaration of an instance of CRWLock invokes the constructor for CRWLock, which, as discussed above, initialized three critical sections and two counters, which are particular to the declared instance of CRWLock.

In addition to the CRWLock class, a class called CRWLockAccess is also defined. The class has a constructor (CRWLockAccess::CRWLockAccess) and a destructor (CRWLockAccess::~CRWLockAccess). The constructor takes two parameters: an reference to an instance of CRWLock, and an instance of CRWLock::LockType. Thus, the profile of the constructor for CRWLockAccess is:

CRWLockAccess(CRWLock& crwtl, CRWLock::LockType it)

The constructor for the CRWLockAccess class calls the LockData method for the instance of the CRWLock class that was passed to it as parameter crwtl. LockData takes a LockType as a parameter, and, when the constructor for CRWLockAccess invokes LockData, it passes to it the LockType parameter it that it received. Therefore, the creation of an instance of CRWLockAccess, will cause an instruction to be issued that invokes the process shown in FIG. 5, performing the steps to request a read or write lock, as indicated by the parameter it. The destructor for the CRWLockAccess class calls UnLockData for the instance of the CRWLock class passed to it as parameter crwtl, and, at that time, passes to UnLockData the value of it as a parameter. Thus, the destruction of an instance of CRWLockAccess invokes the process shown in FIG. 6, performing the steps to release a read or write lock, as indicated by the parameter lt.

This deployment of the invention can be used in the following manner. Suppose a programmer wants to protect a resource (e.g., a global integer labeled A) by a lock. The programmer declares an instance of CRWLock coextensive with the scope of the resource to be protected (in this case, as a global object). Such an instance might be called Lock_A. Whenever the programmer enters a section of code requiring a lock on resource A, the programmer opens a local scope, and then declares an instance of CRWLockAccess, parameterized by: (1) the name of the lock protecting the resource (in this case Lock_A); and (2) the type of lock requested (e.g., CRWLock::ReadLock). At the end of the section of code requiring a lock, the programmer closes the local scope. Again, the closing of the local scope causes the unlock instruction to be issued, without the programmer having to issue it explicitly.

Table 3 shows a program embodying the example described above.

TABLE 3

```
L1:    int A;
L2:    CRWLock Lock_A;
L3:    main( )
L4:    {
L5:        // instructions
L6:        {
L7:            CRWLockAccess lck(Lock_A, CRWLock::ReadLock);
L8:            // instructions that read from A
L9:        }
L10:   }
```

In Table 3, line L8 contains instructions that read from A, which need to be protected by a read lock on resource A. Therefore, the programmer protects these instructions by opening a local scope at line L6, and declaring an instance of CRWLockAccess (named lck) at line L7. The CRWLock-Access declaration is parameterized by the name of the lock that protects the relevant resource (in this case, that lock is named Lock_A), and also by the type of lock to be requested (in this case, ReadLock, which is an enumerated type defined in the CRWLock class). The constructor associated with CRWLockAccess effectively causes the instruction "Lock_A. LockData (CRWLock::ReadLock)" to be issued upon creation of lck at line L7, thereby setting in motion the process shown in FIG. 5 to obtain a lock. After the reading instructions at line L8 have executed, inner scope is exited at line L9, causing the destructor for lck to execute. This destructor effectively causes the instruction "Lock_A.UnLockData(CRWLock::ReadLock)" to be issued, thereby setting in motion the process shown in FIG. 6, whereby the lock is released.

Thus, the foregoing is an embodiment of the invention wherein the concurrent threads are threads of a single computer program running in one of the MICROSOFT WINDOWS 95/98/NT/2000 operating systems, critical sections are implemented through the MICROSOFT WINDOWS 95/98/NT/2000 critical section facility, and the locking and unlocking processes can be invoked by constructors and destructors in the C++ programming language.

Example Timing Scenarios in a Preferred Embodiment

When the invention is implemented in the manner described above, the interaction among reading and writing threads as they request and release locks can be observed with reference to FIGS. 7–11. Each of the threads depicted requires access to a single resource, and each figure shows the time at which each thread is granted access to that resource. In each figure, an arrow shows the progression of time as the depicted actions occur. When two or more blocks are shown at the same vertical position along the arrow, these block should be interpreted as showing multiple actions that occur at the same point in time.

Figure 7:
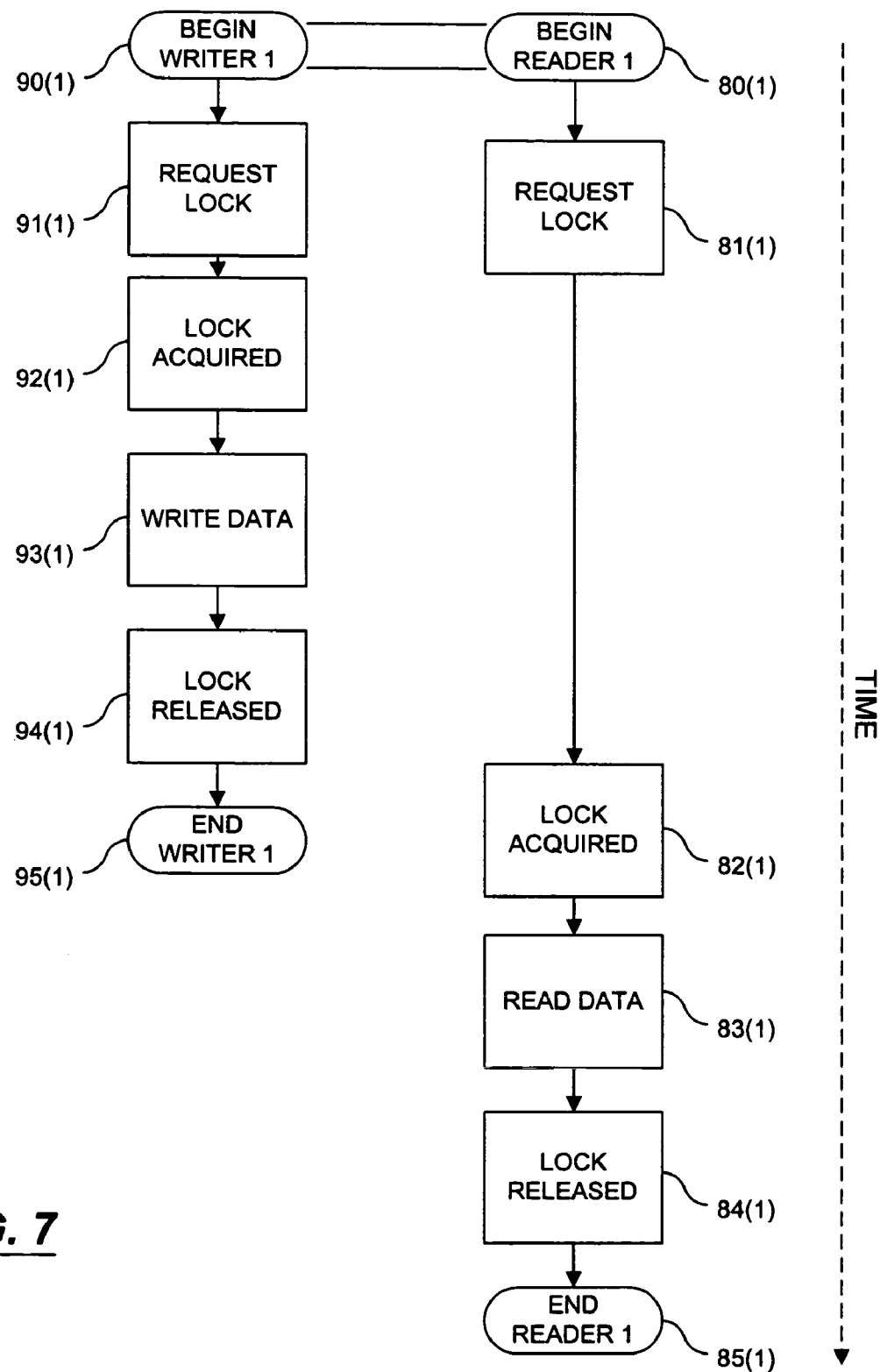
FIGS. 7–11 are flow diagrams, showing various scenarios of threads requesting locks and the resolution of those requests by an exemplary implementation of the invention.

FIG. 7 shows the case in which a writing thread (labeled "writer 1") and a reading thread (labeled "reader 1") each want access to the same resource. At step 91(1), writer 1 requests a write lock on the resource. The request may be issued by opening a local scope and declaring an instance of a lock object, in the manner described above. A short time later at step 81(1), reader 1 requests a read lock on the resource. Writer 1 acquires a write lock at step 92(1). Writer 1 then proceeds to write data to the resource at step 93(1). When writer 1 has finished writing data to the resource, it releases the write lock at step 94(1). The release of the write lock may be accomplished by closing the local scope in the manner described above. Because writer 1 had acquired the write lock at step 92(1), reader 1 was unable to acquire a read lock until the writer 1 released the write lock. Therefore, step 82(1), in which the lock is acquired, is shown in FIG. 7 as occurring later in time than step 94(1). After acquiring a read lock, reader 1 proceeds to read data from the resource at step 83(1), and then to release the lock at step 84(1).

Continuing with reference to FIG. 7, it will be observed that both reader 1 and writer 1 issued their respective requests for locks prior to the time that either request was granted. Writer 1, which requested a lock slightly earlier than reader 1, was granted the first lock. It is important to note, however, that when two inconsistent lock requests are pending (e.g., a read lock request and a write lock request, or two write lock requests), and neither request has yet been granted, there is no logical reason to grant the requests in the order in which they were issued. In the implementation of the invention which is discussed above, it is not possible for reader 1's lock request to be evaluated and processed until writer 1 has actually acquired the lock at step 92(1) and subsequently released it at step 94(1). This is true because, in the implementation discussed above, every request for a lock, whether that request is for a write lock or for a read lock, begins by claiming the WRITE critical section (or waiting to do so if the WRITE critical section is unavailable). When writer 1 requested a lock at step 91(1), it immediately acquired the WRITE critical section, and, in the implementation discussed above, a thread acquiring a write lock does not release the WRITE critical section until it releases the write lock. Therefore, when the processing of reader 1's request for a lock commences with a claim to the WRITE critical section (because all lock requests begin by claiming the WRITE critical section), evaluation of that request will not be able to proceed until writer 1 releases the WRITE critical section, which, in the discussed implementation, occurs when it releases the write lock at step 94(1). However, the implementation discussed above is only one possible implementation of the invention. The invention is not limited to the implementation provided herein, and it will be appreciated by those skilled in the art that many different implementations of the invention are possible, including implementations in which lock requests may be granted in an order different from that depicted in FIG. 7.

With further respect to FIG. 7, those skilled in the art will also appreciate the possibility that the two lock requests at steps 81(1) and 91(1) could have been made simultaneously, rather than at slightly different times. In many computing environments, true simultaneity is not possible, but rather is an illusion provided by the environment itself. For example, a modern multi-tasking operating system, such as the MICROSOFT WINDOWS 95/98/NT/2000 family of operating systems, may create the illusion that two threads or tasks are executing at the same time by rapidly switching execution between the threads or tasks. In such a case, it is not possible for two lock requests to be made at exactly the same time, as one request would necessarily precede the other. In environments in which it is possible for two lock requests to be made at exactly the same time (e.g., a multi-processor environment), there is no reason to grant write requests ahead of read requests, or vice versa. Various methods (e.g., granting read requests first, breaking the tie based on a random number, etc.) may be used to resolve the conflict, which are within the scope and spirit of the invention. In FIG. 7, if steps 81(1) and 91(1) had occurred at exactly the same time (in an environment permitting true simultaneity), and the conflict had been resolved by first granting a read lock to reader 1, then reader 1 would have proceeded until it released its lock at step 84(1), after which time writer 1 would be able to proceed from step 92(1) onward.

Figure 8:
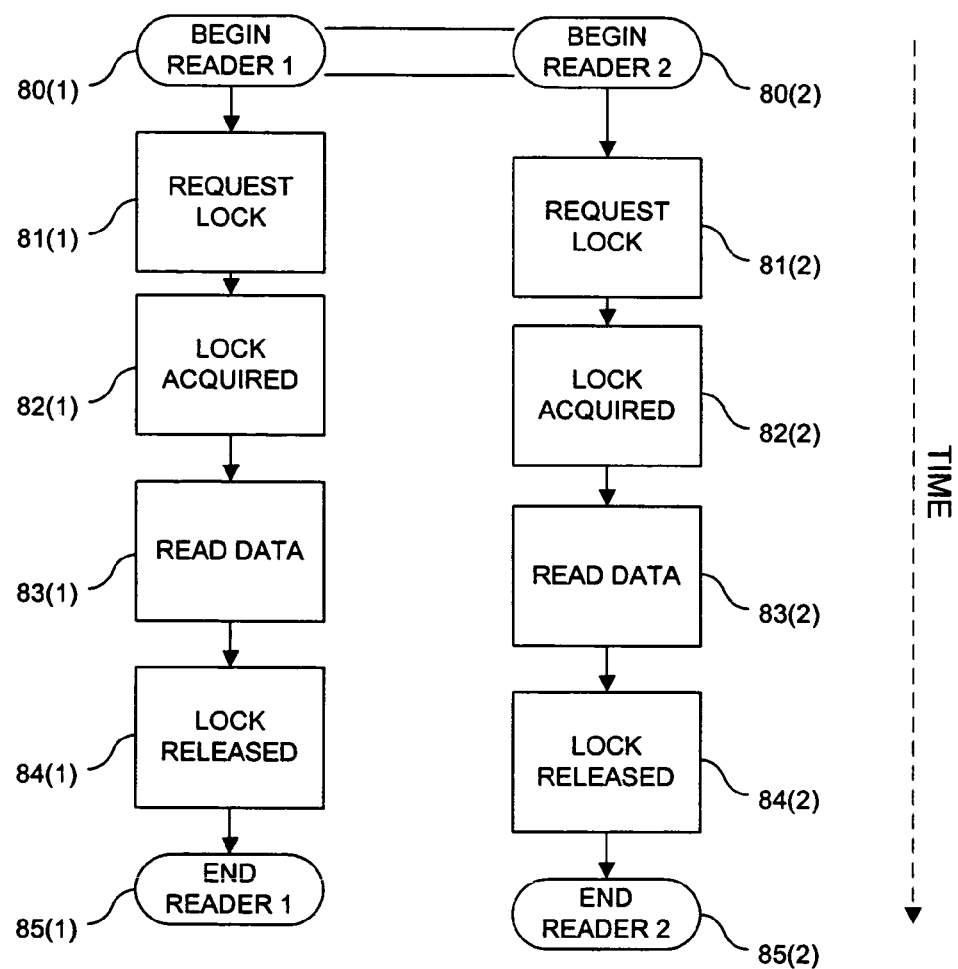
Figure 9:
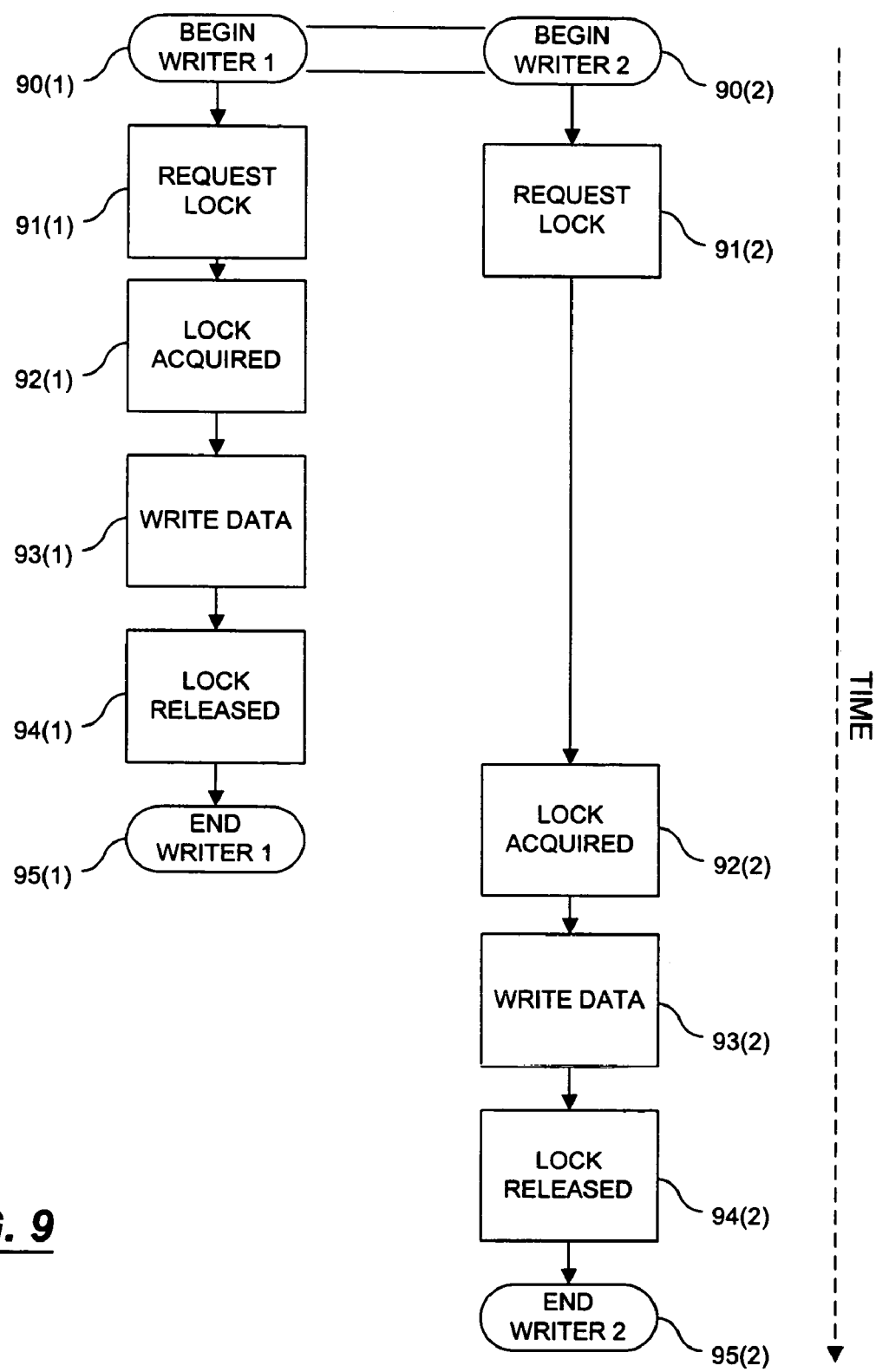

Another example of the interaction of two threads is shown in FIG. 8, which depicts the case in which two threads need to read the same resource. As shown, reader 1 and reader 2 request read locks at steps 81(1) and 81(2), respectively. In a preferred embodiment of the invention, multiple reading threads can be granted concurrent access to a single resource, so the two threads are permitted to proceed in parallel. Steps 82(2)–84(2) in reader 2 are analogous to steps 82(1)–84(1) in reader 1.

Figure 11:
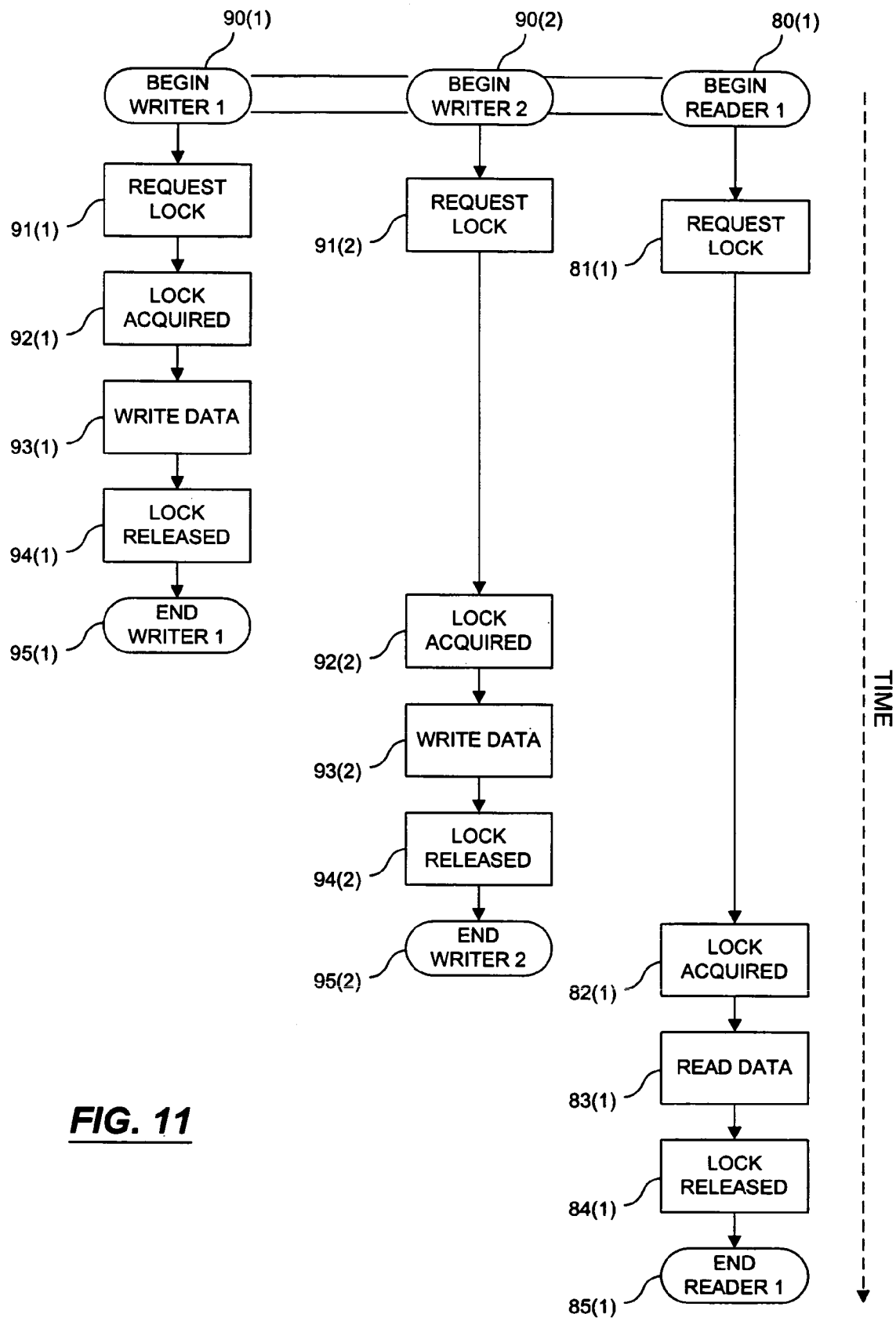

FIG. 11 shows a case in which two writing threads, writer 1 and writer 2, need to write to the same resource. Writer 1 requests a write lock at step 91(1), and writer 2 requests a write lock at step 91(2), which occurs slightly later in time that step 91(1). Because two threads are not permitted to write to a resource at the same time, writer 1 is permitted to proceed, while writer 2 must wait until writer 1 is finished. In the example depicted in FIG. 9, writing thread proceeds to acquire a lock, write data to the resource, and release the lock, at steps 92(1)–94(1). Writer 2 waits until writer 1 has completed step 94(1) before proceeding to acquire a lock at step 92(2), write data to the resource at step 93(2), and release the lock at step 94(2). As discussed above in connection with FIG. 7, since writer 1 and writer 2 both issued their lock requests before either was granted, there is no logical reason why writer 1's lock request must be granted before writer 2's request. However, in the implementation discussed above, which is only one of many possible implementations of the invention, writer 1 acquired the WRITE critical section as soon at writer 1 issued a lock request, thereby preventing writer 2 from acquiring a lock until writer 1 released the lock (and thus the WRITE critical section) at step 94(1).

Figure 10:
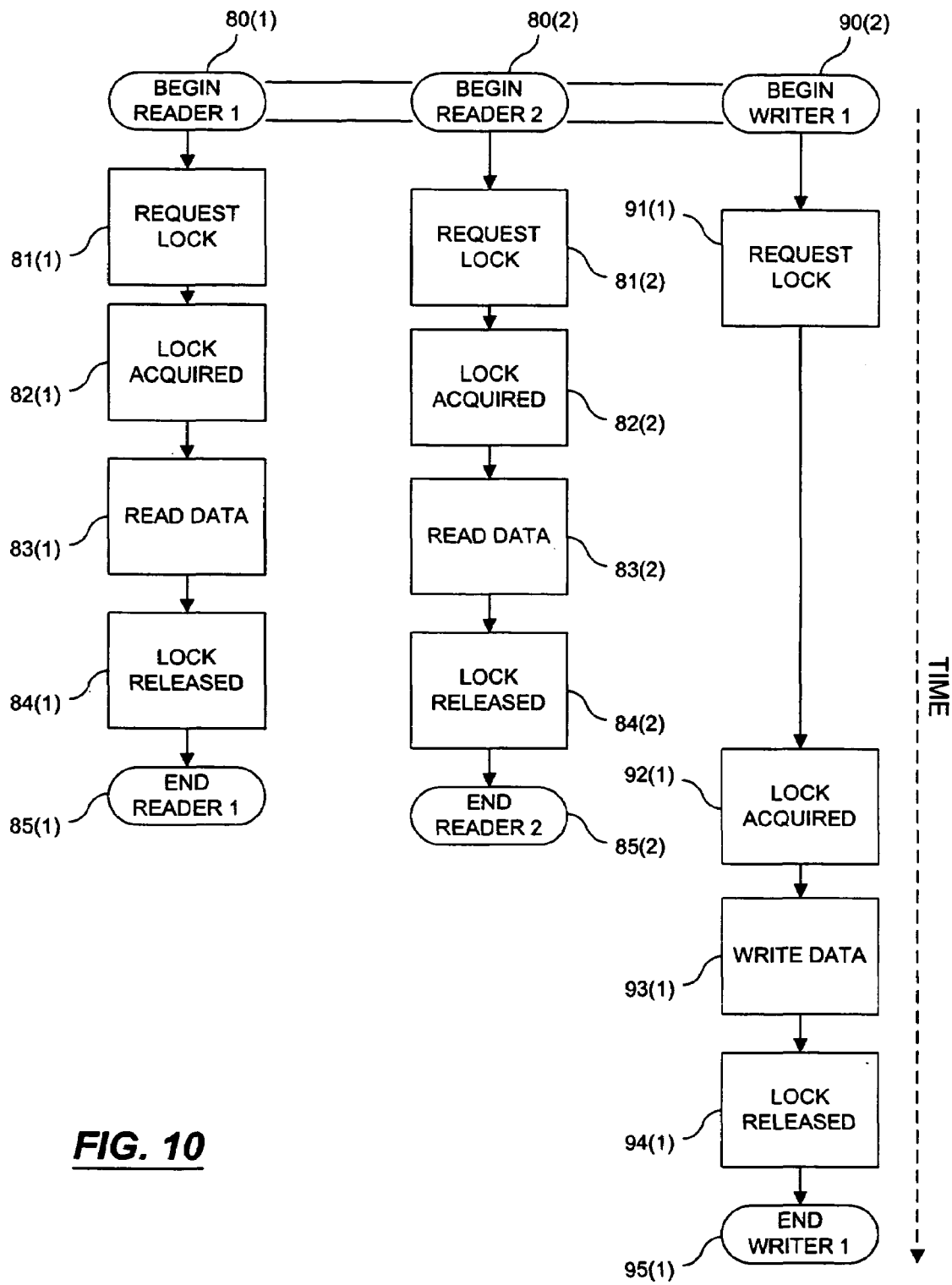

FIG. 10 shows the resolution of a three-way conflict between three threads issuing simultaneous lock requests. Two of the threads are reading threads, and one of the threads is a writing thread. Reader 1 issues a lock request at step 81(1), followed shortly thereafter by reader 2's lock request at step 81(2), followed shortly thereafter by writer 1's lock request at step 91(1). Reader 1 is permitted to proceed to acquire the lock and read the resource at steps 82(1) and 83(1). Because multiple read operations can take place at the same time, reader 2 is also permitted to acquire the lock and to read the resource at steps 82(2) and 83(2). Writer 1, however, waits until it can have exclusive access to the resource, which, in the depicted example, means waiting until reader 1 and reader 2 have completed steps 84(1) and 84(2). After steps 84(1) and 84(2) have been completed, writer 1 proceeds with steps 92(1)–94(1). In the depicted example, the two reading threads were permitted to proceed before the writing thread.

As discussed above in connection with FIG. 7, it would theoretically have been possible for writer 1 to proceed first. In the example shown in FIG. 10, however, the implementation disclosed herein results in reader 1's acquiring a lock before writer 1's request for a lock could be evaluated, albeit for a slightly different reason that what has been discussed above. When reader 1 issued the first lock request, it claimed the WRITE critical section. (Even though reader 1 requests a read lock, in the disclosed implementation, all lock requests—read or write—begin by claiming the WRITE critical section.) However, unlike the case of a write lock, where the thread does not release the WRITE critical section until it releases the write lock, a thread acquiring a read lock releases the WRITE critical section as soon as it determines that it is a read lock instead of a write lock that is being requested. However, by the time that the thread requesting a read lock has released the WRITE critical section, the requesting thread has also acquired the MAIN critical section, which precludes other threads' lock requests from being processed until the requesting thread releases the MAIN critical section, which it will not do until it has acquired a read lock. In other words, in the disclosed implementation, writer 1's request for a write lock cannot be evaluated until reader 1 has already acquired a read lock, at which time writer 1 will be precluded from obtaining a write lock until all read locks have been released. The disclosed implementation, however, is only one embodiment of the invention, and other embodiments and implementations in which the three requests depicted in FIG. 10 would result in writer 1 proceeding first are encompassed by the invention. In such an implementation, reader 1 and reader 2 would have waited for writer 1 to finish, and they would have acquired their respective locks at steps 82(1) and 82(2) only after writer 1 had released the read lock at step 94(1). Of course, even in the case where writer 1 proceeded first, reader 1 and reader 2 would still be able to proceed concurrently with respect to each other after writer 1 had released its write lock.

FIG. 11 shows another case of a conflict between three threads requesting a lock on a single resource. Two of the threads are writing threads, and one of the threads is a reading thread. Writer 1 requests a write lock at step 91(1). A short time later, writer 2 requests a write lock at step 91(2), and, a short time later, reader 1 requests a read lock at step 81(1). The first lock is acquired by writer 1, at step 92(1). Writer 1 proceeds to write data to the resource at step 93(1), and then to release the lock at step 94(1). Writer 2 next acquires a write lock at step 92(2), writes data to the resource at step 93(2), and releases its write lock at step 94(2). Subsequently, reader 1 acquires a read lock at step 82(1), reads data from the resource at step 83(1), and releases the read lock at step 84(1).

As previously discussed in connection with FIG. 7, since all three locks were requested before any of the locks was granted, there is no logical reason why writer 1 needed to acquire the first lock. However, for implementation-specific reasons that are discussed above in connection with FIG. 7 and need not be repeated here, since writer 1 issued the first lock request, it will acquire the first lock.

It must be observed with respect to FIG. 7 that, after writer 1 has acquired and released its write lock, it is indeterminate whether writer 2 or reader 1 will acquire the next lock. Even within the disclosed implementation, it is not possible to determine whether writer 2 or reader 1 will acquire the next lock after writer 1. The reason for this indeterminacy is that, in the critical section facility of the MICROSOFT WINDOWS 95/98/NT/2000 family of operating systems, when two threads are waiting to claim a particular critical section, it is undefined which of the two threads will claim it first. In the disclosed implementation, writer 1 claims the WRITE critical section at step 91(1). When writer 2 and reader 1 subsequently request their respective locks at steps 91(2) and 81(1), each commences its process of requesting a lock by attempting to claim the WRITE critical section. Writer 2 and reader 1 each attempt to claim the WRITE critical section by issuing the system call:
EnterCriticalSection(&WRITE);

As depicted, writer 2 issues a lock request at step 91(2) slightly earlier in time than reader 1 at step 81(1). Therefore, writer 2 issues the above system call slightly earlier than reader 1. However, at the time that writer 2 issues the above system call, the WRITE critical section has already been claimed by writer 1, which successfully claimed it as part of step 91(1). Therefore, the operating system's response to writer 2's attempt to claim the WRITE critical section is to perform the operation depicted in FIG. 3—i.e., to switch control to another concurrently-executing thread, and to return to writer 2 sometime later to check whether the write critical section has become free.

Reader 1 is one of the concurrently-executing threads to which the operating system may grant control. If the operating system switches control to reader 1, then the operating system will receive reader 1's request for the WRITE critical section (issued as part of step 81(1)). Because the WRITE critical section is unavailable at the time that reader 1 issues the request at step 81(1), the operating system's response to reader 1 is identical to its response to writer 2—i.e., to switch control to another concurrently-executing thread, and to return to reader 1 sometime later to check whether the write critical section has become available. It will be observed that, at the time that writer 2 and reader 1 have issued requests for the WRITE critical section, they are both in a "suspended" (i.e., "hanging") state, in which the operating system will periodically "check up" on them to see if the WRITE critical section each thread needs in order to proceed has become free. However, within the MICROSOFT WINDOWS 95/98/NT/2000 family of operating systems, when two threads have become suspended waiting to claim the same critical section, it is undefined which thread will be permitted to claim the critical section first after it becomes free. Therefore, contrary to what is depicted in FIG. 11, it is possible that, reader 1 would be permitted to proceed before writer 2, even though writer 2 issued a lock request at step 91(2) slightly earlier in time than reader 1 issued a lock request at step 81(1). Experimental results show that, when two threads are waiting to claim the same critical section, the operating system usually grants that critical section first to the thread that first requested it. Therefore, the timing sequence depicted in FIG. 11, in which writer 2 proceeds before reader 1, is the most likely scenario, although the depicted result is not guaranteed in the disclosed implementation of the invention. However, as noted above, the invention is not limited to the disclosed implementation, and various implementations are possible without departing from the spirit and scope of the invention.

Thus, a read/write thread lock has been disclosed. While the invention has been described with reference to preferred embodiments, it is understood that the words which have been used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. Particularly, while the invention has been described with reference to the MICROSOFT WINDOWS 95/98/NT/2000 family of operating systems, the C++ programming language, and program threads that share a common address space, the invention is not limited to any environment comprising any of those elements, or combination thereof. Those skilled in the art, having the benefit of the teachings of this specification, may effect numerous modifications thereto and changes may be made without departing from the scope and spirit of the invention in its aspects.

I claim:

1. A system for managing the use of a resource shared among concurrently-executing threads, said system comprising:
   a record for maintaining information as to whether any of said threads is accessing said resource at a given point in time, said record comprising a read counter and a write counter;
   an object, which comprises or references:
      a constructor, said constructor comprising computer-executable instructions to obtain a lock on said resource, to record said lock in said record, to increment said read counter when any of said threads reads from said resource, and to increment said write counter when any of said threads writes to said resource; and
      a destructor, said destructor comprising a set of computer-executable instructions to release said lock, to record the release of said lock in said record, and to decrement said read counter and said write counter;
   wherein the constructor instructions are executed upon creation of an instance of said object within a local scope, wherein the destructor instructions are executed upon the exiting of said local scope, and wherein no instruction, other than the instruction to exit said local scope, is required to release said lock.

2. The system of claim 1, wherein said constructor further comprises an instruction to claim a critical section, and wherein said destructor further comprises an instruction to relinquish said critical section.

3. The system of claim 2, wherein said critical section is implemented by way of a critical section facility of an operating system.

4. The system of claim 2, wherein said constructor further comprises instructions to condition the claiming of said critical section upon the value of said read counter and said write counter, and wherein said destructor further comprises instructions to condition the relinquishment of said critical section upon the value of said read counter and said write counter.

5. The system of claim 1, wherein said object is a class object in the C++ programming language.

6. The system of claim 1, wherein said resource comprises a data object located within the address space of a computer program.

7. A method of managing a resource shared among a plurality of concurrently-executing threads, comprising the acts of:
   claiming a first critical section, using a class object that is instantiated as a result of a lock request, the lock request being made by instantiating an instance of a class, the constructor for the class causing the first critical section to be claimed, wherein said first critical section is unavailable to a thread seeking to do a write to said resource and to a thread seeking to do a read from said resource whenever any of said threads is presently writing to said resource, and wherein said first critical section is available within a short time period, and no later than when one or more other threads that are not writing to said resource have relinquished said first critical section as a result of said other threads determining that said other threads are not requesting a write lock, to a thread seeking to do a write to said resource and to a thread seeking to do a read from said resource whenever none of said threads is presently writing to said resource;

if said first critical section is unavailable, waiting at least until said first critical section becomes available;

claiming a second critical section, wherein said second critical section is unavailable to a thread seeking to do a write to said resource whenever any of said threads is presently reading from said resource;

if said second critical section is unavailable, waiting at least until said second critical section becomes available; and executing at least one instruction that accesses said resources wherein the method further comprises:

creating a local class instance; and after said executing said executed instruction, destroying said local class instance;

wherein said claiming acts are invoked by the constructor for said local class instance, and wherein the destructor for said local class instance relinquishes at least one of said critical sections.

8. The method of claim 7, wherein said threads are threads of a single multi-threaded computer program.

9. The method of claim 7, wherein said critical sections are implemented by way of a critical section facility of an operating system.

10. The method of claim 7, wherein said at least one executed instruction that accesses said resource is a write access, and wherein said method further comprises the acts of:

relinquishing said second critical section; and after performing said at least one executed instruction, relinquishing said first critical section.

11. The method of claim 7, wherein said at least one executed instruction that accesses said resource is a read access, and wherein said method further comprises the acts of:

relinquishing said first critical section; and after performing said executing act, relinquishing said second critical section, unless another set of instructions is presently reading from said resource.

12. The method of claim 11, wherein the determination of whether any set of instructions is presently reading from said resource is made by testing the value of a counter.

13. The method of claim 7, wherein said local class instance is a C++ class, wherein said act of creating a local class instance comprises opening a local scope in a program in the C++ programming language, and wherein said act of destroying said local class instance comprises closing said local scope.

14. The method of claim 7, further comprising the act of incrementing a counter, wherein said act of claiming said second critical section is conditioned upon the value of said counter.

15. The method of claim 7, further comprising the acts of claiming and relinquishing a third critical section, wherein said third critical section is relinquished prior to executing said one instruction.

16. The method of claim 7, wherein said resource comprises a data object located within the address space of a computer program.

17. A computer-readable medium having computer-executable instructions to perform a method of managing a resource shared among a plurality of concurrently-executing threads, said method comprising:

claiming a first critical section, using a class object that is instantiated as a result of a lock request, the lock request being made by instantiating an instance of a class, the constructor for the class causing the first critical section to be claimed, wherein said first critical section is unavailable to a thread seeking to do a write to said resource and to a thread seeking to do a read from said resource whenever any of said threads is presently writing to said resource, and wherein said first critical section is always available to a thread seeking to do a write to said resource and to a thread seeking to do a read from said resource whenever none of said threads is presently writing to said resource;

if said first critical section is unavailable, waiting at least until said first critical section becomes available;

claiming a second critical section, wherein said second critical section is unavailable to a thread seeking to do a write to said resource whenever any of said threads is presently reading from said resource;

if said second critical section is unavailable, waiting at least until said second critical section becomes available; and executing at least one instruction that accesses said resource;

wherein the method further comprises:

creating a local class instance; and after said executing said executed instruction, destroying said local class instance;

wherein said claiming acts are invoked by the constructor for said local class instance, and wherein the destructor for said local class instance relinquishes at least one of said critical sections.

18. A method of managing a resource in a computer environment that supports concurrent execution of a plurality of sets of computer-executable instructions, said method comprising:

in a one of said sets of instructions:

opening a local scope;

creating an object instance within said local scope, wherein said instance comprises or references a constructor method, and wherein said constructor method comprises instructions to obtain a read lock or a write lock on said resource, to increment a read counter when obtaining said read lock, and to increment a write counter when obtaining said write lock;

performing, subsequent to creating said instance, one or more operations, wherein at least one of said operations reads from or writes to said resource; and, when none of said plurality of sets of computer executed instructions seeks to read from or write to said resource, closing said local scope, whereupon said instance is destroyed, said instance further comprising or referencing a destructor method, and wherein said destructor method comprises instructions to release said read lock or said write lock.

19. The method of claim 18, wherein said sets of instructions are written in the C++ programming language, and wherein said object instance is a class instance in the C++ programming language.

20. The method of claim 18, wherein said constructor further comprises an instruction to claim a critical section.

21. The method of claim 20, wherein said sets of instructions are threads of a single multi-threaded computer program executing under an operating system, and wherein said critical sections are implemented by way of the critical section facility of said operating system.

22. The method of claim 18, wherein a value of said read counter is a number of read locks outstanding on said resource.

23. The method of claim 18, wherein said resource comprises a data object located within the address space of a computer program.

24. A computer-readable medium having computer-executable instructions to perform a method of managing a resource in a computer environment that supports concurrent execution of a plurality of sets of computer-executable instructions, said method comprising:

in a one of said sets of instructions:
  opening a local scope;
  creating an object instance within said local scope, wherein said instance comprises or references a constructor method, and wherein said constructor method comprises instructions to obtain a read lock or a write lock on said resource, to increment a read counter when obtaining said read lock, and to increment a write counter when obtaining said write lock;
  performing, subsequent to creating said instance, one or more operations, wherein at least one of said operations reads from or writes to said resource; and, when none of said plurality of sets of computer executed instructions seeks to read from or write to said resource,
  closing said local scope, whereupon said instance is destroyed, said instance further comprising or referencing a destructor method, and wherein said destructor method comprises instructions to release said read lock or said write lock.

25. A method of managing a resource in a computing environment that supports concurrent execution of a plurality of sets of computer-executable instructions, said method comprising:

(a) issuing, in a first of said sets of instructions, a first request for said first of said sets of instructions to obtain a lock on said resource, wherein said request comprises an indication as to whether said set of instructions needs a read lock on said resource or a write lock on said resource, and wherein said request is issued by creating a local class instance, wherein a constructor for said class instance issues said request;

(b) claiming a first critical section, wherein said first critical section is unavailable to said first of said sets of instructions whenever any of said sets of instructions is presently writing to said resource, and wherein said first critical section is available within a short time period to said first of said sets of instructions whenever none of said sets of instructions is presently writing to said resource;

(c) if said indication is that said first of said sets of instructions needs a write lock on said resource:
  (c)(1) claiming a second critical section; and
  (c)(2) relinquishing said second critical section;
whereupon said write lock is granted to said first of said sets of instructions;

(d) if said indication is that said first of said sets of instructions needs a read lock on said resource:
  (d)(1) relinquishing said first critical section; and
  (d)(2) if no other one of said plurality of sets of instructions, exclusive of said first of said sets of instructions, has a read lock on said resource, claiming said second critical section;
whereupon said read lock is granted to said first of said sets of instructions (e) issuing, in said first of said sets of instructions, a second request to release said lock:

(f) if said lock is a read lock and no other one of said sets of instructions, exclusive of said first of said sets of instructions, presently has a read lock on said resource, relinquishing said second critical section; and (g) if said lock is a write lock, relinquishing said first critical section;

and wherein the method further comprises:
  destroying said local class instance, wherein said second request is issued by the destructor for said class instance.

26. The method of claim 25, wherein said sets of instructions are threads of a single computer program executing under control of an operating system, and wherein said critical sections are implemented by way of the critical section facility of said operating system.

27. The method of claim 25, further comprising the acts of:
  after said act of issuing said first request, claiming a third critical section; and
  before, or contemporaneously with, the granting of a lock, relinquishing said third critical section.

28. The method of claim 25 wherein said class instance is a class instance in the C++ programming language.

29. The method of claim 25 further comprising the acts of incrementing and decrementing a counter, wherein the value of said counter is the number of read locks outstanding on said resource, and wherein said indication of whether any other of said sets of instructions has a read lock on said resource are made by testing the value of said counter.

30. The method of claim 25, wherein said resource comprises a data object located within the address space of a computer program.

31. A computer-readable medium having computer-executable instructions to perform a method of managing a resource in a computing environment that supports concurrent execution of a plurality of sets of computer-executable instructions, said method comprising:

(a) issuing, in a first of said sets of instructions, a first request for said first of said sets of instructions to obtain a lock on said resource, wherein said request comprises an indication as to whether said set of instructions needs a read lock on said resource or a write lock on said resource, and wherein said request is issued by creating a local class instance, wherein a constructor for said class instance issues said request;

(b) claiming a first critical section, wherein said first critical section is unavailable to said first of said sets of instructions whenever any of said sets of instructions is presently writing to said resource, and wherein said first critical section is made available to said first of said sets of instructions whenever none of said sets of instructions is presently writing to said resource;

(c) if said indication is that said first of said sets of instructions needs a write lock on said resource:
  (c)(1) claiming a second critical section; and
  (c)(2) relinquishing said second critical section;

whereupon said write lock is granted to said first of said sets of instructions;
- (d) if said indication is that said first of said sets of instructions needs a read lock on said resource:
  - (d)(1) relinquishing said first critical section; and
  - (d)(2) if no other one of said plurality of sets of instructions, exclusive of said first of said sets of instructions, has a read lock on said resource, claiming said second critical section;

whereupon said read lock is granted to said first of said sets of instructions
- (e) issuing, in said first of said sets of instructions, a second request to release said lock;
- (f) if said lock is a read lock and no other one of said sets of instructions, exclusive of said first of said sets of instructions, presently has a read lock on said resource, relinquishing said second critical section; and
- (g) if said lock is a write lock, relinquishing said first critical section;

and wherein the method further comprises:

destroying said local class instance, wherein said second request is issued by the destructor for said class instance.

* * * * *